US009161403B2

(12) United States Patent
Sugawara et al.

(10) Patent No.: US 9,161,403 B2
(45) Date of Patent: Oct. 13, 2015

(54) DRIVING CIRCUIT HAVING A DUMMY LOAD CONNECTED TO ONE OUTPUT NODE OF A DIFFERENTIAL PAIR

(75) Inventors: Mariko Sugawara, Kawasaki (JP); Yukito Tsunoda, Kawasaki (JP); Satoshi Ide, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 498 days.

(21) Appl. No.: 13/214,672

(22) Filed: Aug. 22, 2011

(65) Prior Publication Data

US 2012/0062143 A1    Mar. 15, 2012

(30) Foreign Application Priority Data

Sep. 9, 2010    (JP) .................................. 2010-202480
Mar. 17, 2011    (JP) .................................. 2011-059859

(51) Int. Cl.
*H01S 3/13*    (2006.01)
*H05B 33/08*    (2006.01)

(52) U.S. Cl.
CPC ........... *H05B 33/0818* (2013.01); *Y02B 20/347* (2013.01)

(58) Field of Classification Search
CPC ............... H01S 3/00; H01S 3/10; H01S 3/13; H05B 37/00; H05B 37/02
USPC .................. 372/29.02, 29.021, 38.02, 38.07; 315/291, 307, 308
See application file for complete search history.

(56) References Cited

U.S. PATENT DOCUMENTS

| 6,097,159 | A * | 8/2000 | Mogi et al. ..................... 315/151 |
| 6,765,942 | B2 * | 7/2004 | Robertson .................. 372/38.02 |
| 6,792,019 | B2 * | 9/2004 | Fattaruso ................... 372/38.07 |
| 6,931,040 | B2 * | 8/2005 | Murata et al. .............. 372/38.02 |
| 7,193,463 | B2 * | 3/2007 | Miyashita et al. ............ 330/252 |
| 8,009,709 | B2 * | 8/2011 | Nelson ....................... 372/38.02 |
| 2004/0081212 | A1 | 4/2004 | Schrodinger |
| 2004/0239373 | A1 | 12/2004 | Seshita |
| 2008/0266283 | A1 | 10/2008 | Suzuki et al. |

FOREIGN PATENT DOCUMENTS

| JP | 07-131252 | 5/1995 |
| JP | 07-226557 | 8/1995 |
| JP | 10-233543 | 9/1998 |
| JP | 11-231270 | 8/1999 |
| JP | 2004-356329 | 12/2004 |
| JP | 2006-040975 | 2/2006 |
| JP | 2009-123959 | 6/2009 |

OTHER PUBLICATIONS

Daniel M. Kuchta et al., "120-Gb/s VCSEL-Based Parallel-Optical Interconnect and Custom 120-Gb/s Testing Station" Journal of Lightwave Technology, vol. 22, No. 9, pp. 2200-2212; Sep. 2004.

(Continued)

*Primary Examiner* — Thuy Vinh Tran
(74) *Attorney, Agent, or Firm* — Staas & Halsey LLP

(57) ABSTRACT

A driving circuit for driving a diode includes at least one differential pair including a first output node and a second output node and configured to switch an output current, a current source configured to adjust the output current, a dummy load coupled to the second output node, a first termination resistor coupled between the first output node and a termination ground, and a second termination resistor coupled between the second output node and the termination ground. The output current is supplied to the diode through the first output node by at least one differential pair.

19 Claims, 33 Drawing Sheets

(56) References Cited

OTHER PUBLICATIONS

Richard Annen et al., "Low power and low noise VCSEL drivier chip for 10 Gbps applications", 2004 IEEE LEOS Annual Meeting Conference Proceedings. vol. 1 pp. 312-313, Nov. 2004.

Kenichi Ohhata et al., "17 Gb/s VCSEL Drivier Using Double-Pulse Asymmetric Emphasis Technique in 90-nm CMOS for Optical Interconnection", 2010 IEEE International Symposium on Circuits and Systems Proceedings. pp. 1847-1850, May 2010.

Japanese Notification of Reasons for Refusal dated Jun. 10, 2014 in Japanese Patent Application No. 2011-059859.

* cited by examiner

US 9,161,403 B2

DRIVING CIRCUIT HAVING A DUMMY LOAD CONNECTED TO ONE OUTPUT NODE OF A DIFFERENTIAL PAIR

CROSS-REFERENCE TO RELATED APPLICATIONS

This application is based upon and claims the benefit of priority of the prior Japanese Patent Application No. 2010-202480, filed on Sep. 9, 2010, and the Japanese Patent Application No. 2011-059859, filed on Mar. 17, 2011, the entire contents of which are incorporated herein by reference.

FIELD

The embodiments disclosed herein relate to a driving circuit.

BACKGROUND

With the improvement in a network transmission speed and the increase in a network capacity, optical signals are increasingly used for short-distance communication and medium-distance communication. As a light source for an optical signal, a compact low-power light-emitting element capable of performing direct modulation is employed. Examples of a light-emitting element include a Laser Diode (LD) such as a Vertical Cavity Surface Emitting Laser (VCSEL). In order to drive a light-emitting element, a driving circuit is used for performing differential amplification on a driving signal for a light-emitting element and driving the light-emitting element with the amplified signal (see, for example, "120-Gb/s VCSEL-Based Parallel-Optical Interconnect and Custom 120-Gb/s Testing Station", *JOURNAL OF LIGHTWAVE TECHNOLOGY*, VOL. 22, NO. 9, September 2004).

SUMMARY

According to an aspect of the embodiments, a driving circuit for driving a diode includes at least one differential pair including a first output node and a second output node and configured to switch an output current, the output current being supplied to the diode through the first output node, a current source configured to adjust the output current, a dummy load coupled to the second output node, a first termination resistor coupled between the first output node and a termination ground, and a second termination resistor coupled between the second output node and the termination ground.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-described examples of a light-emitting element, since the output impedance of a driving circuit is high and does not match the input impedance of a light-emitting element, the reflection of a driving signal occurs between the driving circuit and the light-emitting element and the high-speed driving of the light-emitting element cannot be achieved. For example, in the case of a driving circuit for performing differential amplification on a driving signal, it is difficult to achieve impedance matching between the driving circuit and a light-emitting element, because the resistance of a bias current source as viewed from a point of connection between the driving circuit and the light-emitting element is high. Accordingly, when the high-speed driving of the light-emitting element is performed, the waveform of light output from the light-emitting element is degraded.

Hereinafter, embodiments will be described below with reference to the accompanying drawings.

In first to eleventh embodiments, an anode driving configuration of a diode driving circuit in which an output node of the diode driving circuit is connected to the anode of a light-emitting element will be described. In twelfth to seventeenth embodiments, a cathode driving configuration of a diode driving circuit in which an output portion in the diode driving circuit is connected to the cathode of a light-emitting element will be described.

<Exemplary Anode Driving Configuration>

(First Embodiment)

Figure 1A:
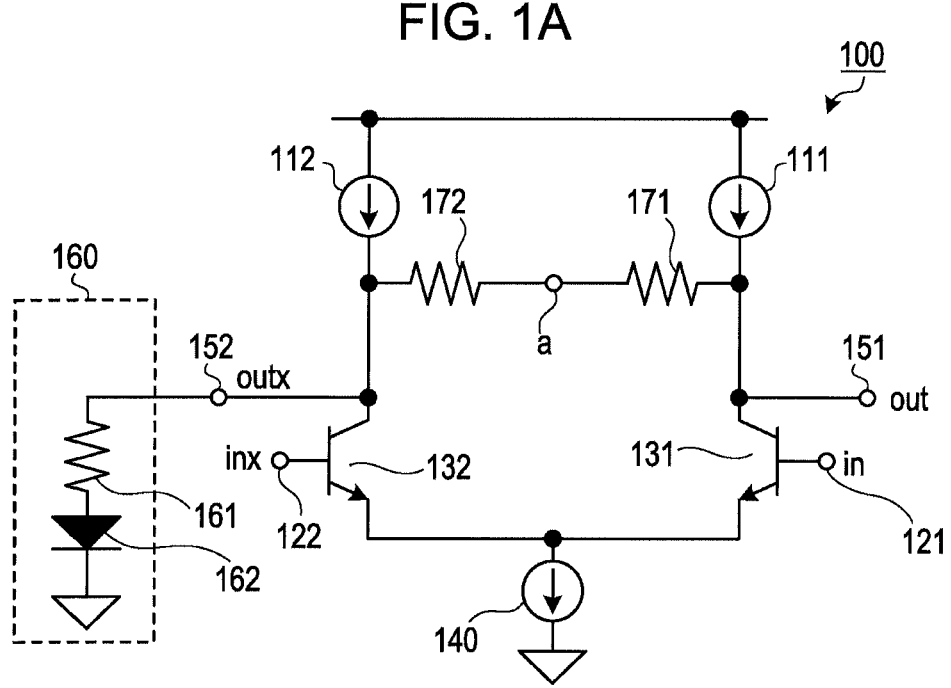
FIG. 1A is a diagram illustrating an exemplary configuration of a diode driving circuit according to a first embodiment.

FIG. 1A is a diagram illustrating an exemplary configuration of a diode driving circuit according to the first embodiment. A diode driving circuit 100 illustrated in FIG. 1A is a Long-Tailed Pair (LTP) differential amplification circuit for performing differential amplification on a driving signal for a driving target. In this embodiment, the driving target is a light-emitting element. A differential signal including a positive-phase signal and a negative-phase signal (the inversion signal of the positive-phase signal) is input into the diode driving circuit 100.

As illustrated in FIG. 1A, the diode driving circuit 100 includes bias current sources 111 and 112, input nodes 121 and 122, transistors 131 and 132, a modulated current source 140, output nodes 151 and 152, a dummy load 160, and resistors 171 and 172. The bias current sources 111 and 112 output a current. On end of the bias current source 111 is connected to a voltage source (not illustrated), and the other end of the bias current source 111 is connected to the transistor 131. One end of the bias current source 112 is connected to the voltage source (not illustrated), and the other end of the bias current source 112 is connected to the transistor 132.

The input nodes 121 and 122 are input nodes of a differential pair into which a differential driving signal is input. More specifically, a positive-phase signal included in the differential driving signal is input into the input node 121 (in), and a negative-phase signal included in the differential driving signal is input into the input node 122 (inx).

The transistors 131 and 132 are, for example, Bipolar Junction Transistors (BJTs) or Field Effect Transistors (FETs). In this embodiment, the transistors 131 and 132 are BJTs.

The base of the transistor 131 is connected to the input node 121, the collector of the transistor 131 is connected to the bias current source 111, and the emitter of the transistor 131 is connected to the modulated current source 140. The base of the transistor 132 is connected to the input node 122, the collector of the transistor 132 is connected to the bias current source 112, and the emitter of the transistor 132 is connected to the modulated current source 140. The modulated current source 140 receives a current from the transistors 131 and 132. One end of the modulated current source 140 is connected to the transistors 131 and 132, and the other end of the modulated current source 140 is connected to the ground.

The output nodes 151 and 152 are output nodes of a differential pair from which a differential driving signal is output. More specifically, the output node 151 is connected between the bias current source 111 and the transistor 131. A light-emitting element that is a driving target is connected to the output node 151. The output node 151 outputs the positive-phase signal included in the differential driving signal to the light-emitting element (out). The output node 152 is connected between the bias current source 112 and the transistor 132. The dummy load 160 is connected to the output node 152. The output node 152 outputs the negative-phase signal included in the differential driving signal to the dummy load 160 (outx).

The dummy load 160 has a load equal to the load of a driving target (light-emitting element) connected to the output node 151, and includes a resistor 161 and a diode 162. One end of the resistor 161 is connected to the output node 152, and the other end of the resistor 161 is connected to the diode 162. One end of the diode 162 is connected to the resistor 161, and the other end of the diode 162 is connected to the ground. The diode 162 has the same diode characteristic as that of a light-emitting element connected to the output node 151. A diode characteristic is, for example, the characteristic of a current that flows in accordance with an applied voltage.

One end of the resistor 171 is connected between the bias current source 111 and the transistor 131, and the other end of the resistor 171 is connected to the resistor 172. The resistor 171 is nearer to the bias current source 111 than to the output node 151. One end of the resistor 172 is connected between the bias current source 112 and the transistor 132, and the other end of the resistor 172 is connected to the resistor 171. The resistor 172 is nearer to the bias current source 112 than to the dummy load 160. A single resistor may function as the resistors 171 and 172.

As viewed from the output node 151, the resistor 171 and the bias current source 111 are connected in parallel. Accordingly, the total resistance value of the bias current source 111 and the resistor 171 as viewed from the output node 151 is the reciprocal of $(1/\infty)+(1/R1)$ $(1/R1)$ where $\infty$ (infinity) represents the resistance value of the bias current source 111 and R1 represents the resistance value of the resistor 171.

Accordingly, even if the resistance value of the bias current source 111 is large, it is possible to easily achieve matching between the output impedance of the diode driving circuit 100 and the input impedance of the light-emitting element connected to the output node 151 using a resistance value R1 of the resistor 171. For example, by making the resistance value R1 of the resistor 171 equal to the resistance value of the light-emitting element, it is possible to achieve matching between the output impedance of the diode driving circuit 100 and the input impedance of the light-emitting element.

The resistors 171 and 172 are on a path connecting the output nodes 151 and 152. By connecting the output node 151 to a light-emitting element and connecting the dummy load 160 to the output node 152, a load on a positive-phase side and a load on a negative-phase side become equal to each other. Accordingly, the output nodes 151 and 152 can be symmetrically operated (the potentials of the output nodes 151 and 152 can be opposite in polarity). As a result, a point a between the resistors 171 and 172 can be virtually connected to the ground (the resistors 171 and 172 can be at the same potential in terms of AC).

Thus, a point that is connected to a termination resistor (the resistor 171) and is stable in terms of AC or a point such as a direct voltage source or the ground to be described later that is connected to a termination resistor (the resistor 171) and is stable in terms of DC is hereinafter referred to as a termination ground.

As described previously, in the diode driving circuit 100, since the termination resistor is connected to the termination ground, the output impedance of the diode driving circuit 100 can be reduced regardless of the high resistance of the bias current source 111. In addition, in the diode driving circuit 100, since the dummy load 160 for a driving target is connected to one of the output nodes (the output node 152), the output nodes 151 and 152 can be symmetrically operated and the output impedance of the diode driving circuit 100 can be stabilized.

It is therefore possible to easily achieve matching between the output impedance of the diode driving circuit 100 and the input impedance of the light-emitting element and prevent the reflection of a driving signal at a point of connection between the diode driving circuit 100 and the light-emitting element. Accordingly, the light-emitting element can be driven at a high speed.

Furthermore, since there is no resistor between the bias current source 111 and the output node 151, a voltage drop can be suppressed. As a result, the flexibility of voltage design for the bias current sources 111 and 112 can be improved and circuit design can be performed using a low voltage source.

Figure 1B:
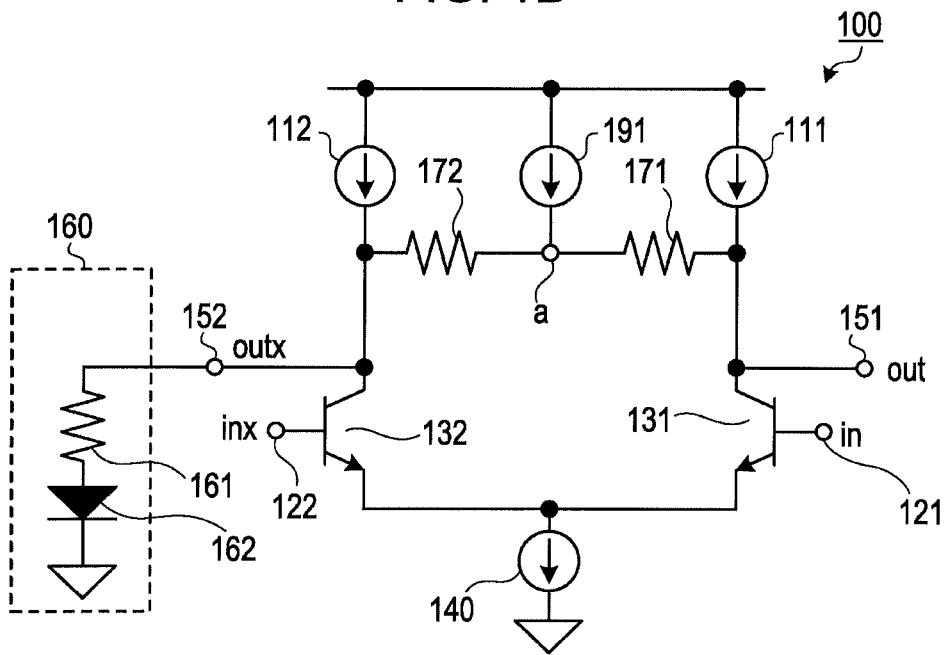
FIG. 1B is a diagram illustrating a first modification of the diode driving circuit illustrated in FIG. 1A.

FIG. 1B is a diagram illustrating a first modification of the diode driving circuit illustrated in FIG. 1A. Referring to FIG. 1B, the same reference numerals are used to identify parts already described with reference to FIG. 1A, and the description thereof will be therefore omitted. As illustrated in FIG. 1B, the diode driving circuit 100 may include a bias current source 191 as an adjustment element in addition to the components illustrated in FIG. 1A. One end of the bias current source 191 is connected to a voltage source (not illustrated), and the other end of the bias current source 191 is connected to the point a. As a result, a bias current can be changed, and a direct current passing through the resistors 171 and 172 can be controlled.

Figure 1C:
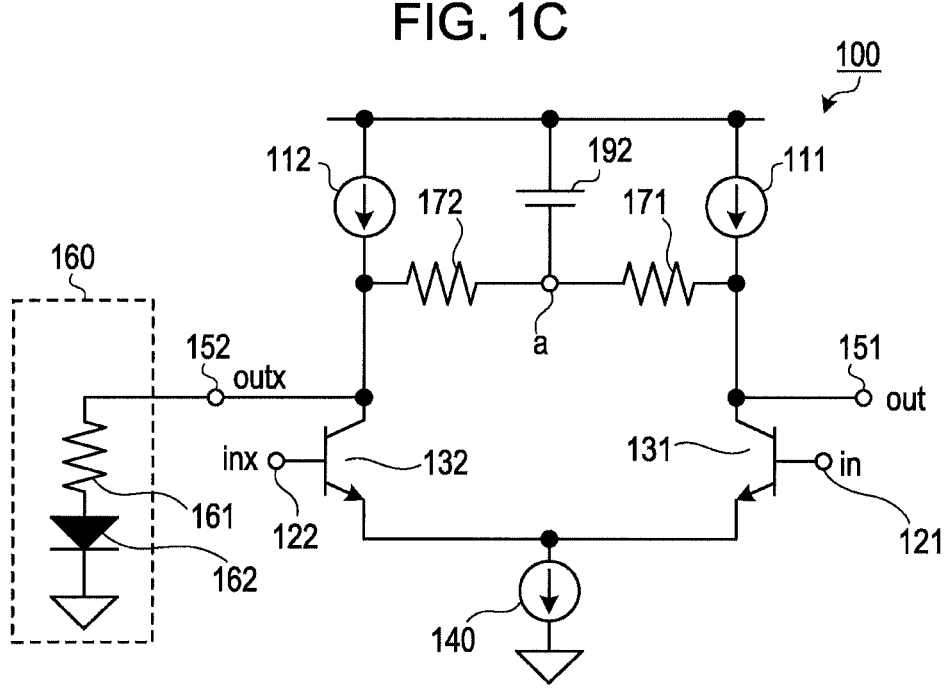
FIG. 1C is a diagram illustrating a second modification of the diode driving circuit illustrated in FIG. 1A.

FIG. 1C is a diagram illustrating a second modification of the diode driving circuit illustrated in FIG. 1A. Referring to FIG. 1C, the same reference numerals are used to identify parts already described with reference to FIG. 1A, and the description thereof will be therefore omitted. As illustrated in FIG. 1C, the diode driving circuit 100 may include a voltage supply 192 as an adjustment element in addition to the components illustrated in FIG. 1A. One end of the voltage supply 192 is connected to a voltage source (not illustrated), and the other end of the voltage supply 192 is connected to the point a. As a result, a bias current can be changed, and a direct current passing through the resistors 171 and 172 can be controlled.

Figure 1D:
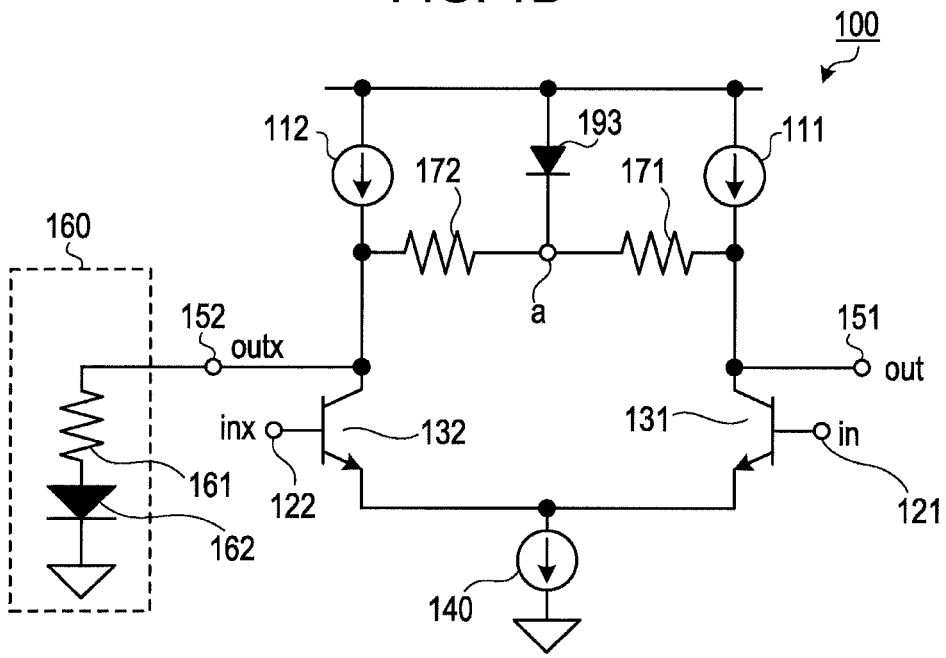
FIG. 1D is a diagram illustrating a third modification of the diode driving circuit illustrated in FIG. 1A.

FIG. 1D is a diagram illustrating a third modification of the diode driving circuit illustrated in FIG. 1A. Referring to FIG. 1D, the same reference numerals are used to identify parts already described with reference to FIG. 1A, and the description thereof will be therefore omitted. As illustrated in FIG. 1D, the diode driving circuit 100 may include a diode 193 as an adjustment element in addition to the components illustrated in FIG. 1A. One end of the diode 193 is connected to a voltage source (not illustrated), and the other end of the diode 193 is connected to the point a. As a result, a bias current can be changed, and a direct current passing through the resistors 171 and 172 can be controlled.

Figure 1E:
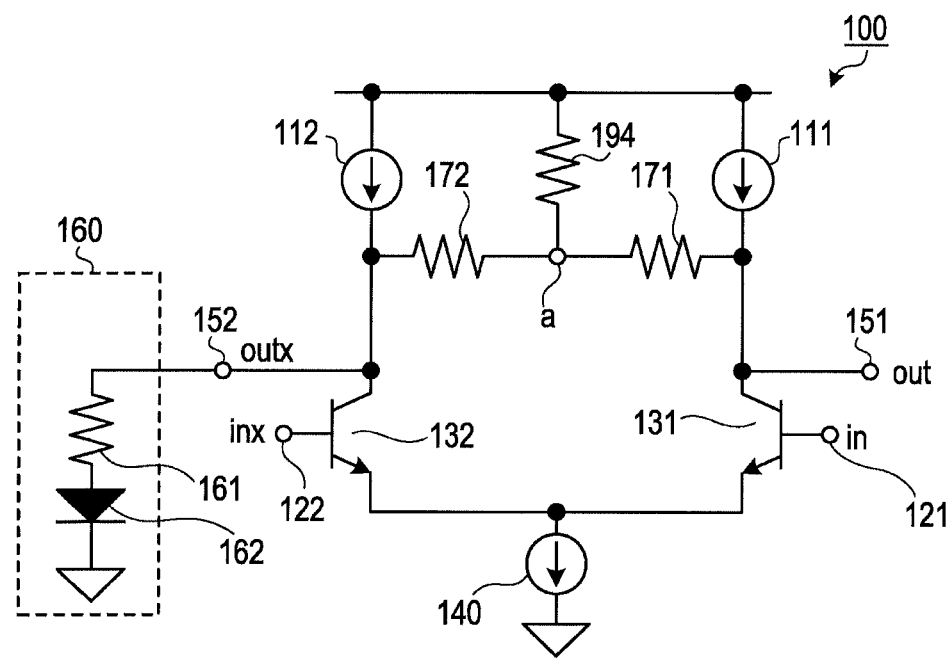
FIG. 1E is a diagram illustrating a fourth modification of the diode driving circuit illustrated in FIG. 1A.

FIG. 1E is a diagram illustrating a fourth modification of the diode driving circuit illustrated in FIG. 1A. Referring to FIG. 1E, the same reference numerals are used to identify parts already described with reference to FIG. 1A, and the description thereof will be therefore omitted. As illustrated in FIG. 1E, the diode driving circuit 100 may include a resistor 194 as an adjustment element in addition to the components illustrated in FIG. 1A. One end of the resistor 194 is connected to a voltage source (not illustrated), and the other end of the resistor 194 is connected to the point a. As a result, a bias current can be changed, and a direct current passing through the resistors 171 and 172 can be controlled.

Figure 2:
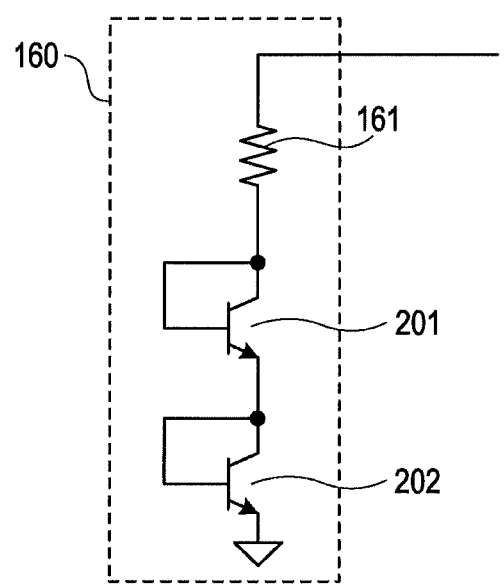
FIG. 2 is a diagram illustrating an example of a dummy load.

FIG. 2 is a diagram illustrating an example of a dummy load. As illustrated in FIG. 2, the dummy load 160 includes the resistor 161 and transistors 201 and 202. The transistors 201 and 202 correspond to the diode 162 illustrated in FIG. 1A. The collector of the transistor 201 is connected to the resistor 161, the base of the transistor 201 is connected to the collector thereof (diode connection), and the emitter of the transistor 201 is connected to the collector of the transistor 202. The transistor 201 functions as a diode.

The collector of the transistor 202 is connected to the emitter of the transistor 201, the base of the transistor 202 is connected to the collector thereof (diode connection), and the emitter of the transistor 202 is connected to the ground. As a result, the transistor 202 functions as a diode. By controlling the diode characteristics of the transistors 201 and 202, the dummy load 160 having a load equal to the load of a light-emitting element connected to the output node 151 can be provided.

(Second Embodiment)

Figure 3A:
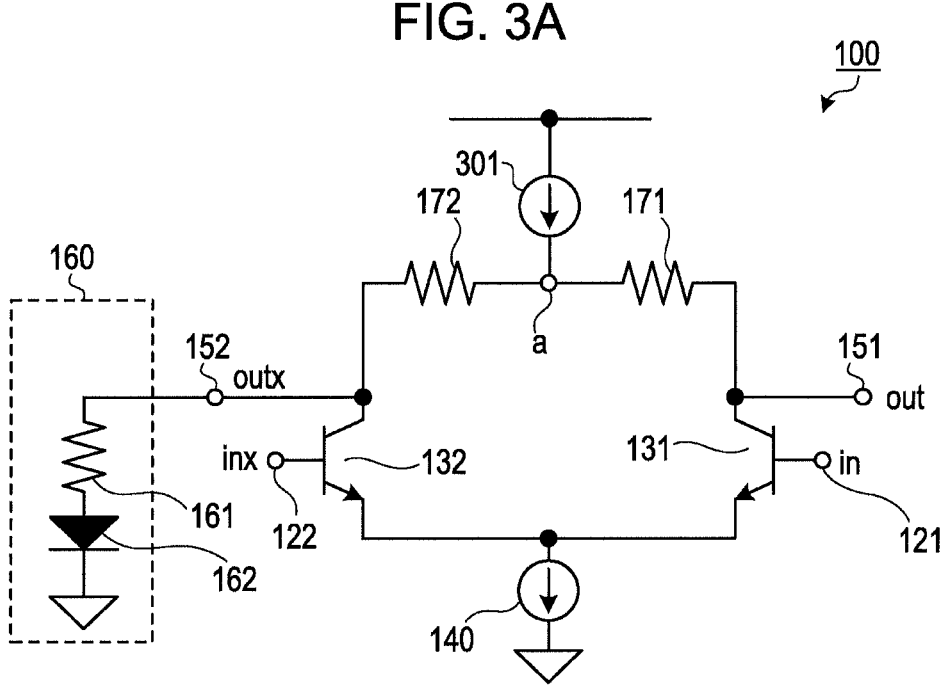
FIG. 3A is a diagram illustrating an exemplary configuration of a diode driving circuit according to a second embodiment.

FIG. 3A is a diagram illustrating an exemplary configuration of a diode driving circuit according to the second embodiment. Referring to FIG. 3A, the same reference numerals are used to identify parts already described with reference to FIG. 1A, and the description thereof will be therefore omitted. The diode driving circuit 100 illustrated in FIG. 3A includes a common bias current source 301 instead of the bias current source 111 on the positive-phase side and the bias current source 112 on the negative-phase side which are illustrated in FIG. 1A. One end of the bias current source 301 is connected to a voltage source (not illustrated), and the other end of the bias current source 301 is connected to the termination ground (the point a). Like in the first embodiment, the termination ground is virtually connected to the ground.

Accordingly, even if the resistance value of the bias current source 301 is large, it is possible to easily achieve matching between the output impedance of the diode driving circuit 100 and the input impedance of a diode to be driven using a resistance value R2 of the resistor 172. As a result, like the diode driving circuit 100 illustrated in FIG. 1A, the diode driving circuit 100 illustrated in FIG. 3A can drive a diode that is a driving target at a high speed.

Figure 3B:
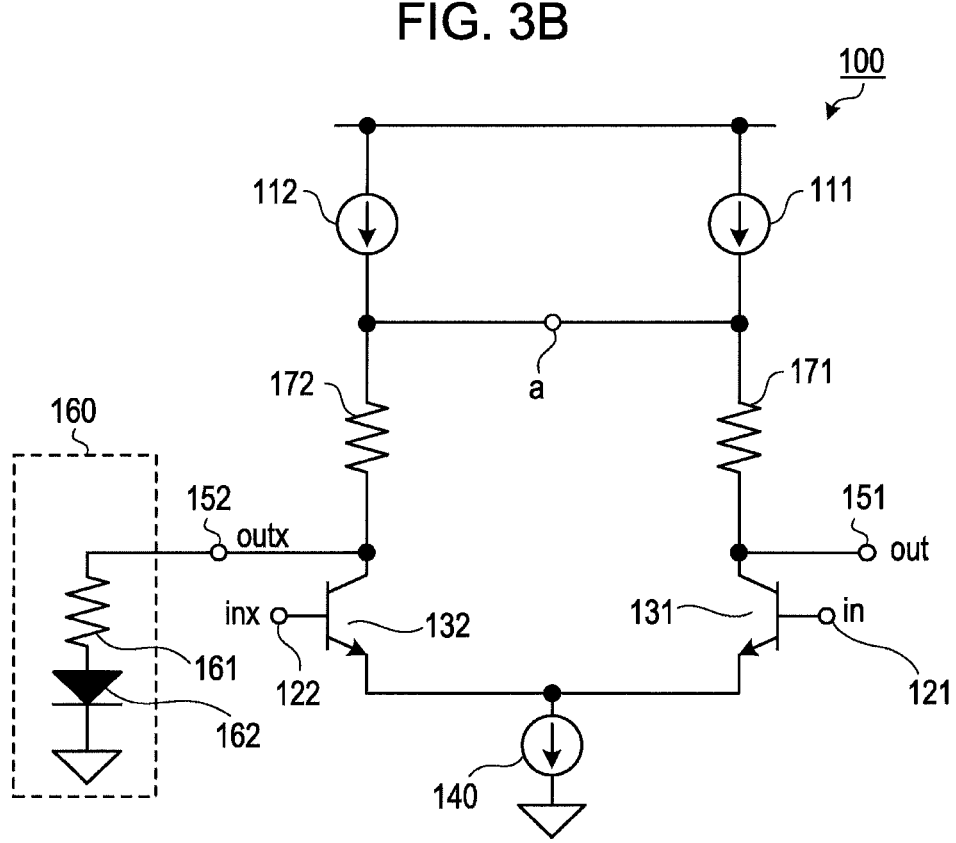
FIG. 3B is a diagram illustrating an exemplary configuration of a diode driving circuit that is equivalent to the exemplary configuration illustrated in FIG. 3A.

FIG. 3B is a diagram illustrating an exemplary configuration of a diode driving circuit that is equivalent to the exemplary configuration illustrated in FIG. 3A. The diode driving circuit 100 illustrated in FIG. 3B differs from the diode driving circuit 100 illustrated in FIG. 1A in that one ends of the bias current sources 111 and 112 are connected between the resistors 171 and 172. The diode driving circuit 100 illustrated in FIG. 3B is equivalent to the diode driving circuit 100 illustrated in FIG. 3A.

(Third Embodiment)

Figure 4A:
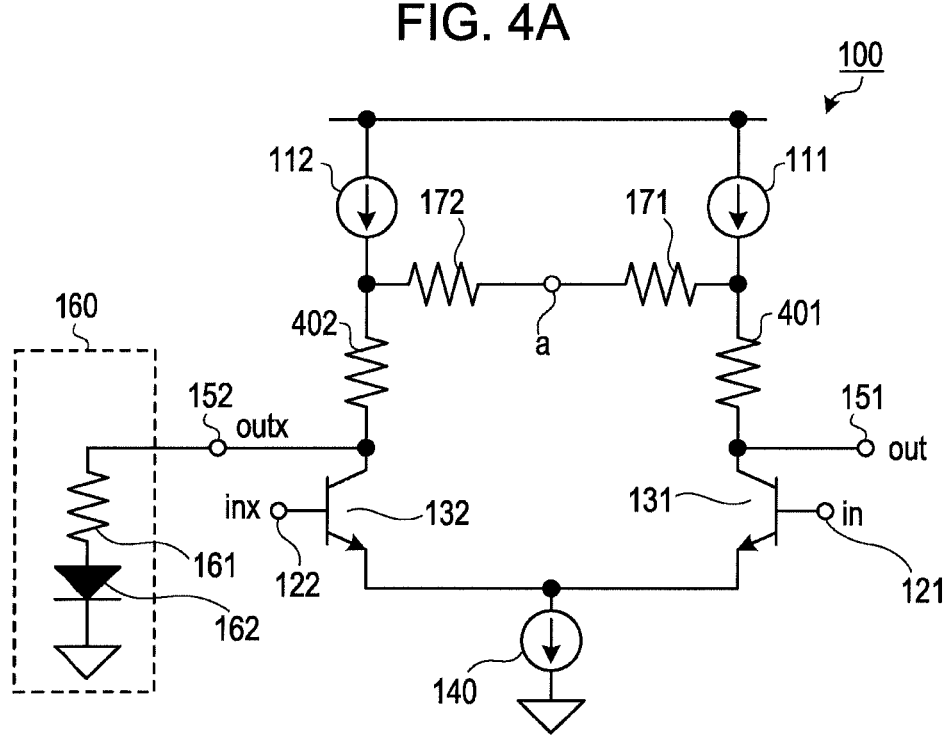
FIG. 4A is a diagram illustrating an exemplary configuration of a diode driving circuit according to a third embodiment.

FIG. 4A is a diagram illustrating an exemplary configuration of a diode driving circuit according to the third embodiment. Referring to FIG. 4A, the same reference numerals are used to identify parts already described with reference to FIG. 1A, and the description thereof will be therefore omitted. As illustrated in FIG. 4A, in the diode driving circuit 100, each of the termination resistors illustrated in FIG. 1A may be divided into resistors connected in series.

More specifically, the diode driving circuit 100 includes resistors 401 and 402 in addition to the components illustrated in FIG. 1A. The resistor 401 is disposed between the bias current source 111 and the transistor 131. The resistor 402 is disposed between the bias current source 112 and the transistor 132.

By connecting one of the resistors into which a termination resistor is divided to the ground, it is possible to easily achieve matching between the output impedance of the diode driving circuit 100 and the input impedance of a light-emitting element. In the configuration illustrated in FIG. 4A, one of the direct current adjustment elements illustrated in FIGS. 1B to 1E may be disposed between the voltage source and the point a.

Figure 4B:
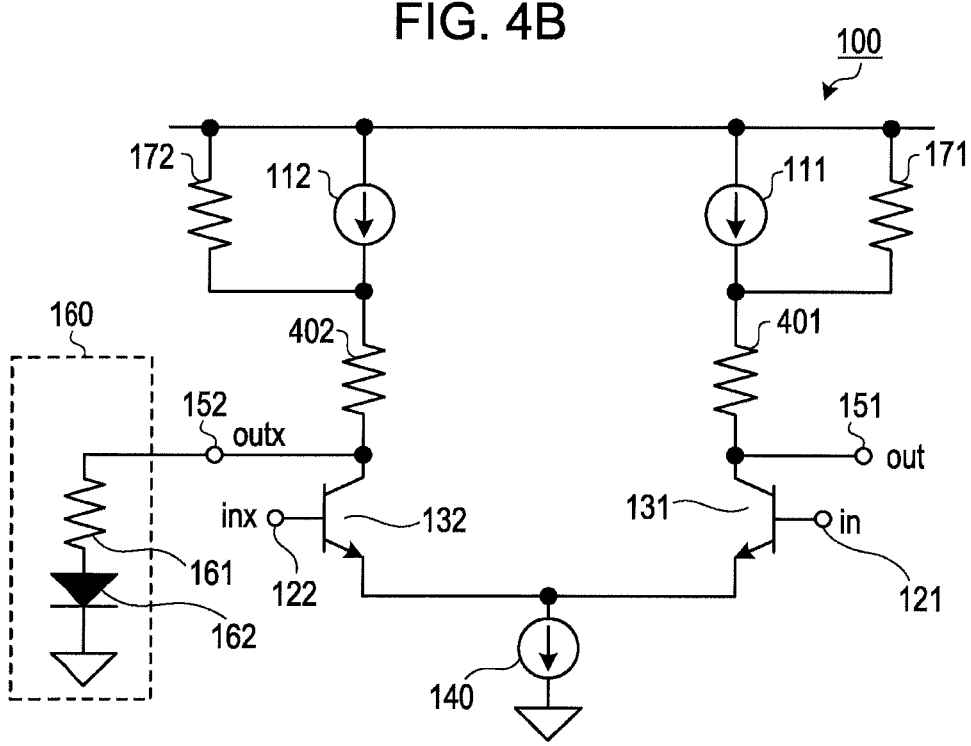
FIG. 4B is a diagram illustrating a first modification of the diode driving circuit illustrated in FIG. 4A.

FIG. 4B is a diagram illustrating a first modification of the diode driving circuit illustrated in FIG. 4A. Referring to FIG. 4B, the same reference numerals are used to identify parts already described with reference to FIG. 4A, and the description thereof will be therefore omitted. As illustrated in FIG. 4B, the resistor 171 and the bias current source 111 may be connected in parallel, and the resistor 172 and the bias current source 112 may be connected in parallel. In this case, the termination ground (the point a) is a voltage source, and is therefore directly connected to the voltage source.

Figure 4C:
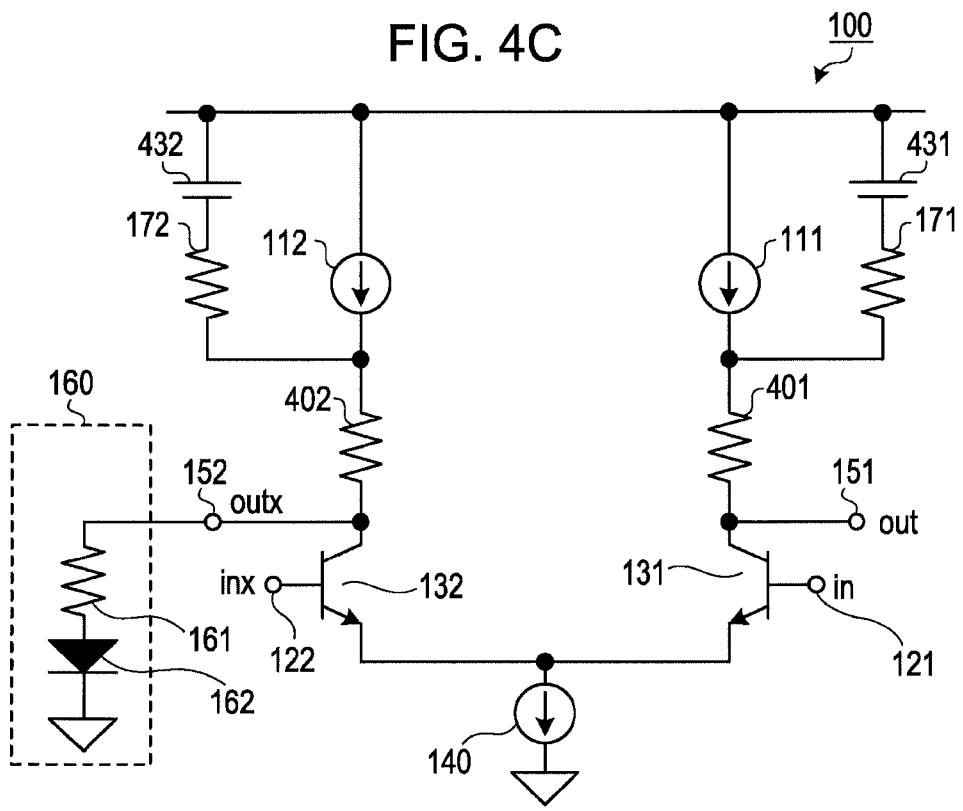
FIG. 4C is a diagram illustrating a first modification of the diode driving circuit illustrated in FIG. 4B.

FIG. 4C is a diagram illustrating a first modification of the diode driving circuit illustrated in FIG. 4B. Referring to FIG. 4C, the same reference numerals are used to identify parts already described with reference to FIG. 4B, and the description thereof will be therefore omitted. As illustrated in FIG. 4C, a voltage supply 431 may be disposed between the bias current source 111 and the voltage source, and a voltage supply 432 may be disposed between the bias current source 112 and the voltage source as an adjustment element. As a result, the DC potential of the output node 151 can be controlled.

Figure 4D:
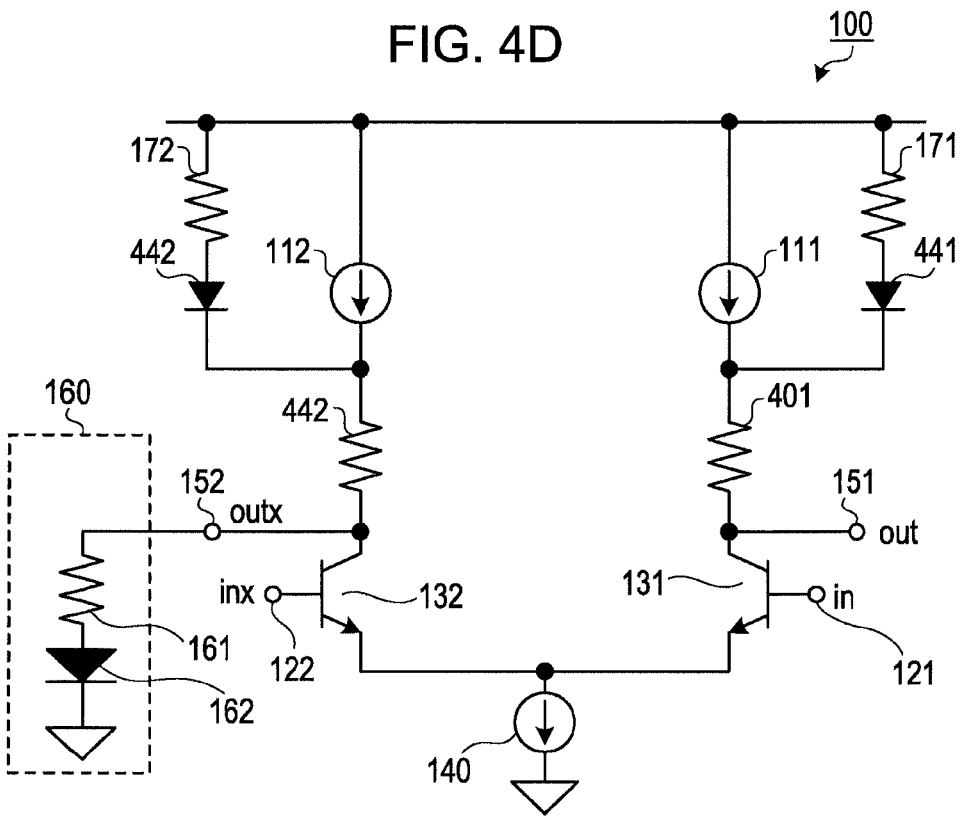
FIG. 4D is a diagram illustrating a second modification of the diode driving circuit illustrated in FIG. 4B.

FIG. 4D is a diagram illustrating a second modification of the diode driving circuit illustrated in FIG. 4B. Referring to FIG. 4D, the same reference numerals are used to identify parts already described with reference to FIG. 4B, and the description thereof will be therefore omitted. As illustrated in FIG. 4D, a diode 441 may be disposed between the bias current source 111 and the resistor 401, and a diode 442 may be disposed between the bias current source 112 and the resistor 402 as an adjustment element. As a result, the DC potential of the output node 151 can be controlled.

As illustrated in FIGS. 4C and 4D, by connecting a low-impedance adjustment element to each of the termination resistors (the resistors 171 and 172) in series, the DC potential of the output node 151 can be controlled.

Figure 4E:
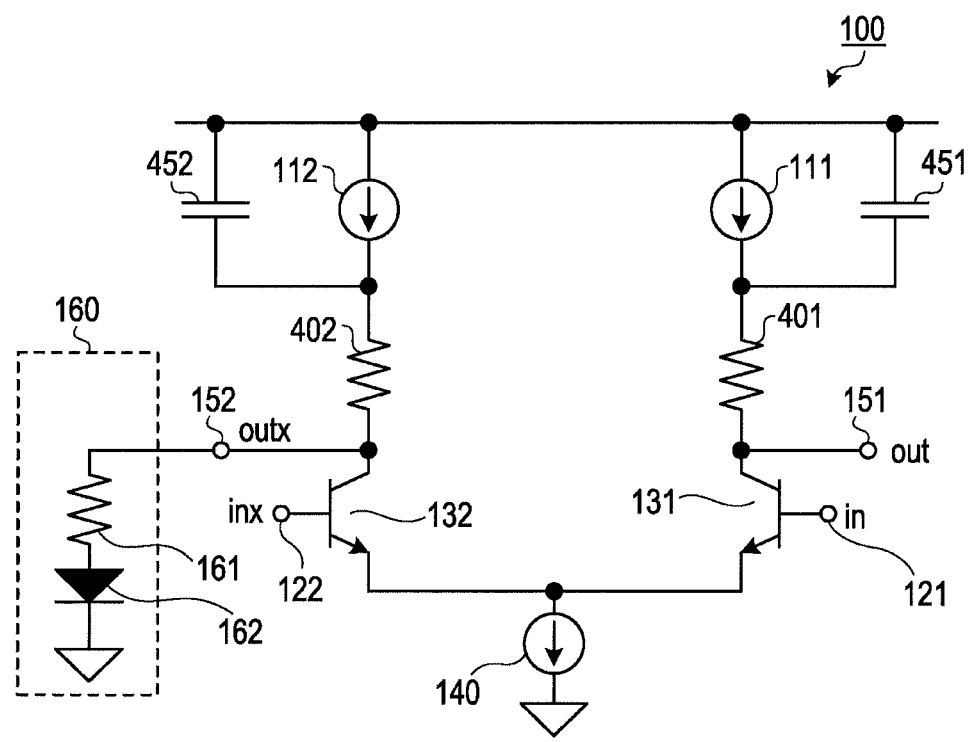
FIG. 4E is a diagram illustrating a third modification of the diode driving circuit illustrated in FIG. 4B.

FIG. 4E is a diagram illustrating a third modification of the diode driving circuit illustrated in FIG. 4B. Referring to FIG. 4E, the same reference numerals are used to identify parts already described with reference to FIG. 4B, and the description thereof will be therefore omitted. As illustrated in FIG. 4E, capacitors 451 and 452 may be disposed instead of the resistors 171 and 172 illustrated in FIG. 4B, respectively. In this case, the termination ground is AC grounded by the capacitors 451 and 452.

(Fourth Embodiment)

Figure 5A:
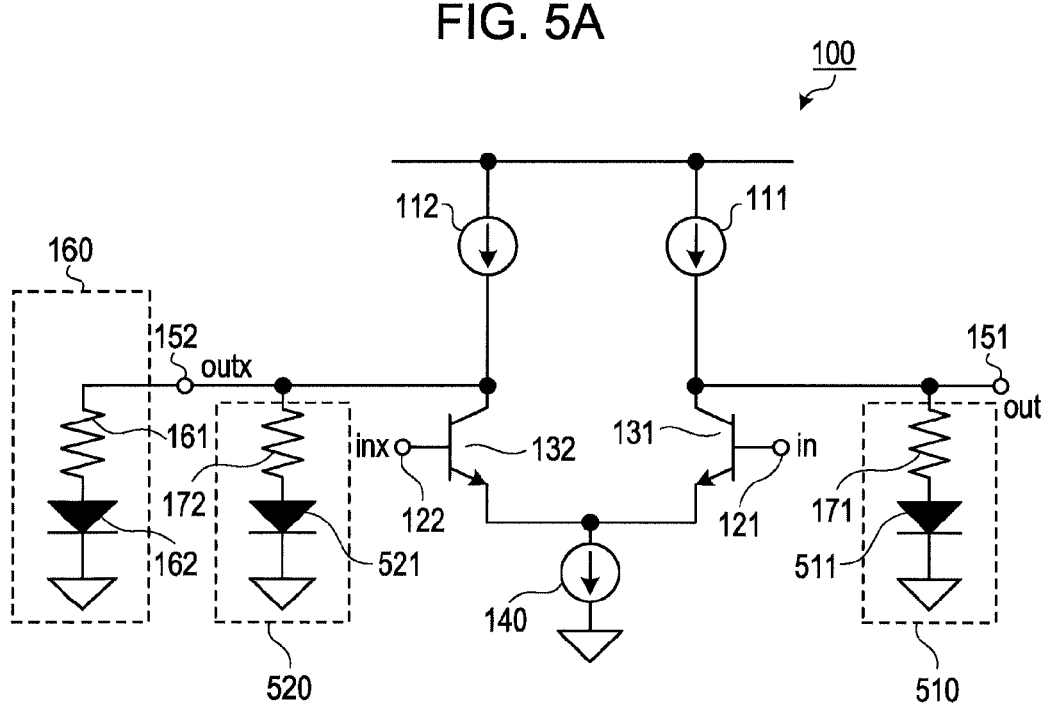
FIG. 5A is a diagram illustrating an exemplary configuration of a diode driving circuit according to a fourth embodiment.

FIG. 5A is a diagram illustrating an exemplary configuration of a diode driving circuit according to the fourth embodiment. Referring to FIG. 5A, the same reference numerals are used to identify parts already described with reference to FIG. 1A, and the description thereof will be therefore omitted. The diode driving circuit 100 illustrated in FIG. 5A includes diodes 511 and 521 in addition to the components illustrated in FIG. 1A. Each of the diodes 511 and 521 has the same diode characteristic as that of, for example, the diode 162 (that is, a light-emitting element).

In the diode driving circuit 100 illustrated in FIG. 5A, one end of the resistor 171 is connected to the output node 151, and the other end of the resistor 171 is connected to the diode 511. One end of the diode 511 is connected to the resistor 171, and the other end of the diode 511 is connected to the ground. Thus, the resistor 171 and the diode 511 are used to form an element 510 whose one end is connected to the output node 151 and the other end is connected to the ground.

One end of the resistor 172 is connected to the output node 152, and the other end of the resistor 172 is connected to the diode 521. One end of the diode 521 is connected to the resistor 172, and the other end of the diode 521 is connected to the ground. Thus, the resistor 172 and the diode 521 are used to form an element 520 whose one end is connected to the output node 152 and the other end is connected to the ground.

Thus, elements (the elements 510 and 520) that have one ends individually connected to the output nodes 151 and 152 and the other ends connected to the ground and have a load equal to the dummy load 160 are provided. In this case, like in the above-described cases, since the resistor 171 is connected to the bias current source 111 in parallel as viewed from the output node 151, the output impedance of the diode driving circuit 100 can be reduced regardless of the high resistance of the bias current source 111.

Since the termination ground (the point a) connecting one ends of the resistors 171 and 172 is grounded to a stable point in terms of DC by diodes, the output impedance of the output node 151 can be stabilized. Accordingly, for example, by adjusting the resistance value of the resistor 171, it is possible to easily achieve matching between the output impedance of the diode driving circuit 100 and the input impedance of a light-emitting element.

In addition, since the diode 521 having the same diode characteristic as that of the diode 162 is connected to one end of the resistor 172, a current flowing through the dummy load 160 and a current flowing through the resistor 172 and the diode 521 can be balanced. The diode 521 is used to adjust the potential at the end. Instead of the diode 521, a voltage supply may be used. By disposing the diode 511 at a diametrically opposed position to the diode 521, the output nodes 151 and 152 can be symmetrically operated.

Since there is no resistor between the bias current source 111 and the output node 151, a voltage drop can be suppressed. As a result, the flexibility of voltage design for the bias current source 111 can be improved and circuit design can be performed using a low voltage source.

Figure 5B:
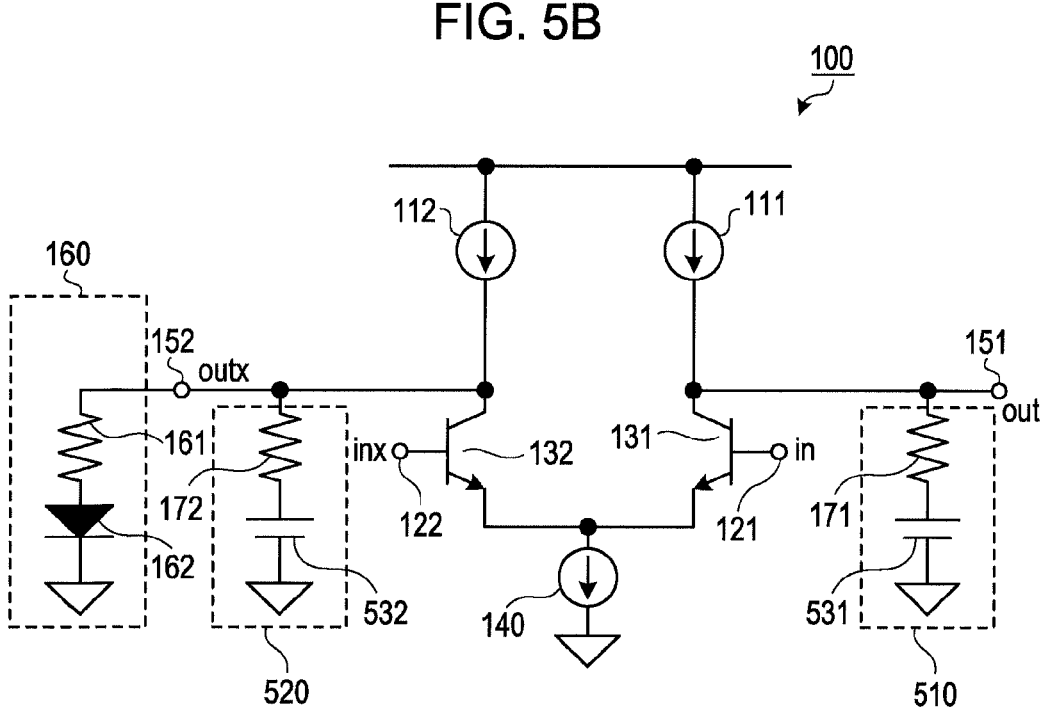
FIG. 5B is a diagram illustrating a first modification of the diode driving circuit illustrated in FIG. 5A.

FIG. 5B is a diagram illustrating a first modification of the diode driving circuit illustrated in FIG. 5A. Referring to FIG. 5B, the same reference numerals are used to identify parts already described with reference to FIG. 5A, and the description thereof will be therefore omitted. As illustrated in FIG. 5B, a voltage supply 531 may be disposed instead of the diodes 511 illustrated in FIG. 5A, and a voltage supply 532 may be disposed as an adjustment element instead of the diode 521. In this case, it is possible to adjust the DC potential of the termination ground (the point a) and control a direct current flowing through the resistors 171 and 172 and the dummy load 160.

Figure 5C:
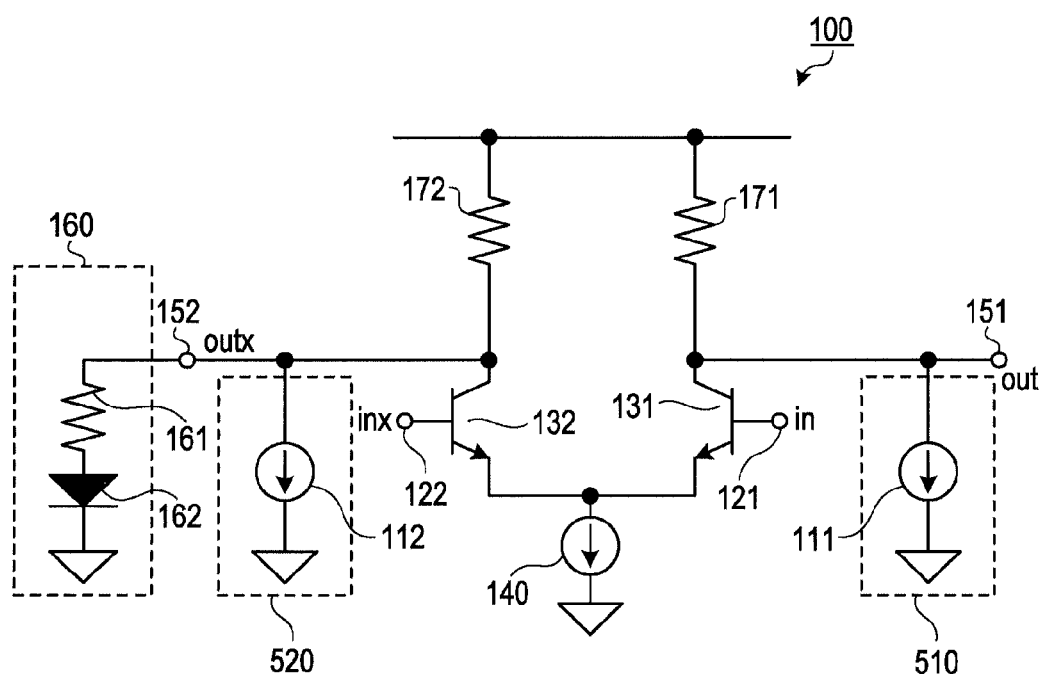
FIG. 5C is a diagram illustrating a second modification of the diode driving circuit illustrated in FIG. 5A.

FIG. 5C is a diagram illustrating a second modification of the diode driving circuit illustrated in FIG. 5A. Referring to FIG. 5C, the same reference numerals are used to identify parts already described with reference to FIG. 5A, and the description thereof will be therefore omitted. As illustrated in FIG. 5C, the positions of the bias current source 111 and the resistor 171 may be exchanged, and the positions of the bias current source 112 and the resistor 172 may be exchanged. In this case, the bias current sources 111 and 112 are connected to the ground. Thus, the bias current sources 111 and 112 may be stable points in terms of DC with respect to the output nodes 151 and 152, respectively.

(Fifth Embodiment)

Figure 6:
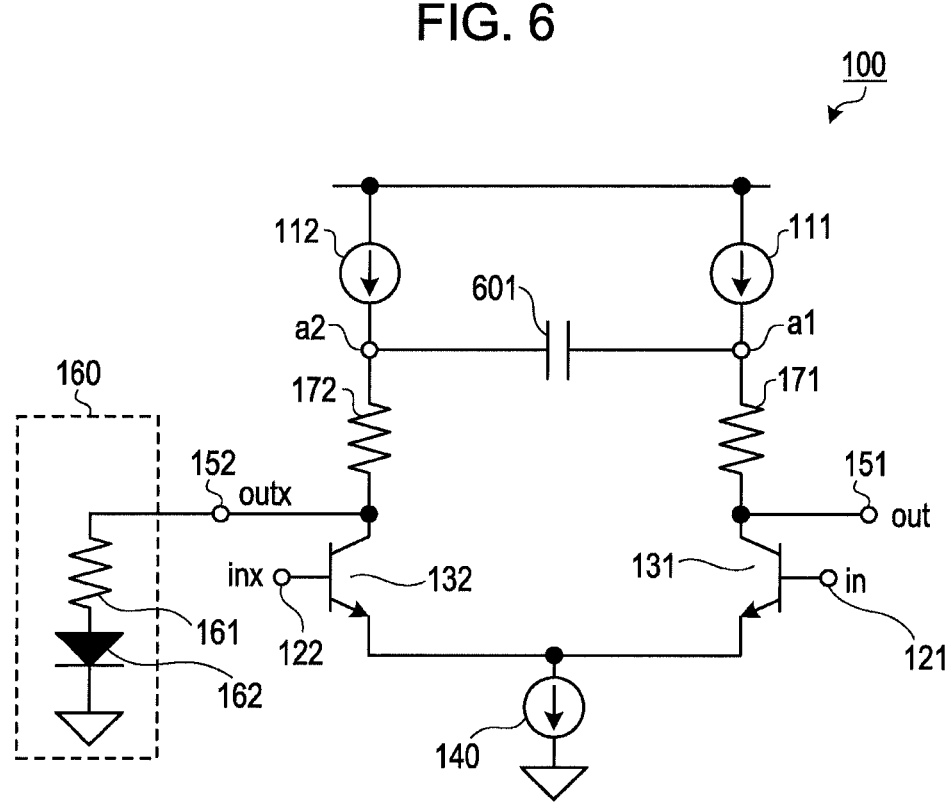
FIG. 6 is a diagram illustrating an exemplary configuration of a diode driving circuit according to a fifth embodiment.

FIG. 6 is a diagram illustrating an exemplary configuration of a diode driving circuit according to the fifth embodiment. Referring to FIG. 6, the same reference numerals are used to identify parts already described with reference to FIG. 1A, and the description thereof will be therefore omitted. The diode driving circuit 100 illustrated in FIG. 6 includes a capacitor 601 in addition to the components illustrated in FIG. 1A. In the diode driving circuit 100 illustrated in FIG. 6, one end of the resistor 171 is connected to the bias current source 111 and the other end of the resistor 171 is connected to the transistor 131, and one end of the resistor 172 is connected to the bias current source 112 and the other end of the resistor 172 is connected to the transistor 132.

One end of the capacitor 601 is connected between the bias current source 111 and the resistor 171, and the other end of the capacitor 601 is connected between the bias current source 112 and the resistor 172. Accordingly, the capacitor 601 is on a path connecting the output nodes 151 and 152. By disposing the dummy load 160 and symmetrically operating the output nodes 151 and 152, points a1 and a2 on both sides of the capacitor 601 can be termination grounds that have the same potential in terms of AC. As a result, the output impedance of the output node 151 can be stabilized. It is therefore possible to easily achieve matching between the output impedance of the diode driving circuit 100 and the input impedance of a light-emitting element.

(Sixth Embodiment)

Figure 7A:
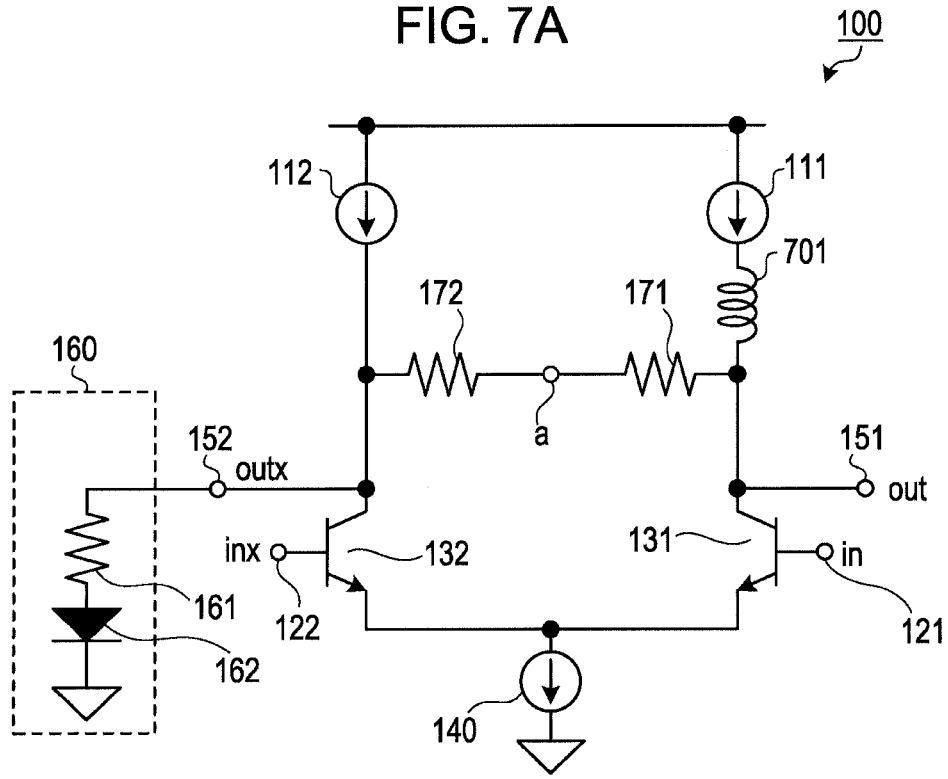
FIG. 7A is a diagram illustrating an exemplary configuration of a diode driving circuit according to a sixth embodiment.

FIG. 7A is a diagram illustrating an exemplary configuration of a diode driving circuit according to the sixth embodiment. Referring to FIG. 7A, the same reference numerals are used to identify parts already described with reference to FIG. 1A, and the description thereof will be therefore omitted. The diode driving circuit 100 illustrated in FIG. 7A includes an inductor 701 in addition to the components illustrated in FIG. 1A. One end of the inductor 701 is connected to the bias current source 111, and the other end of the inductor 701 is connected to the resistor 171 and the transistor 131. Since the high-frequency component of a driving signal makes a voltage jump, the diode driving circuit 100 can be operated at a high speed.

Figure 7B:
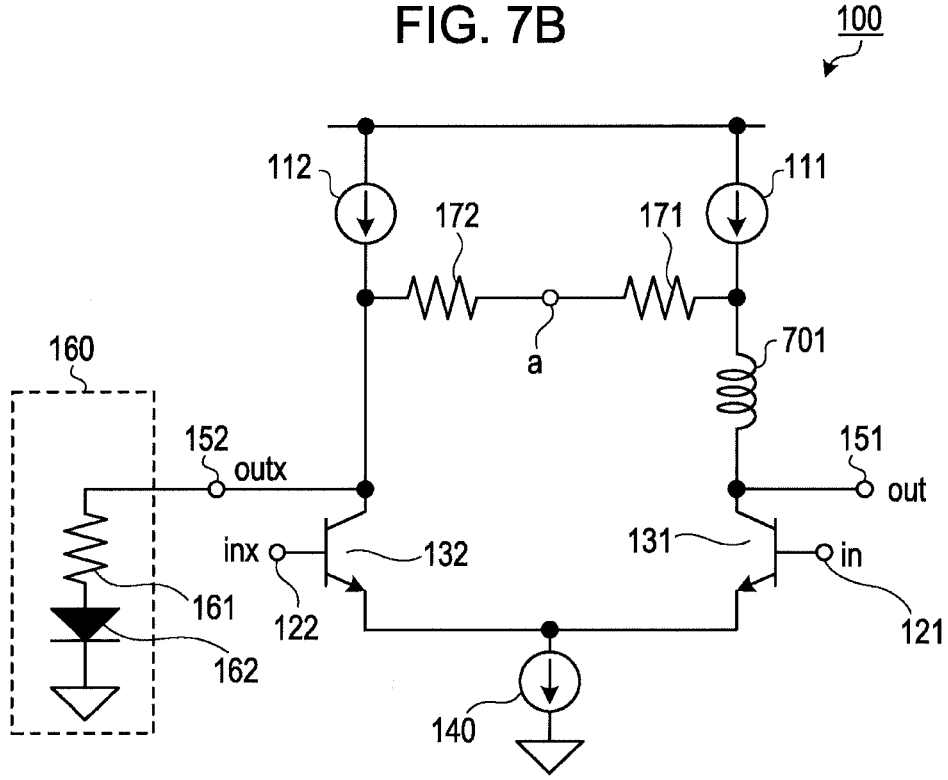
FIG. 7B is a diagram illustrating a modification of the diode driving circuit illustrated in FIG. 7A.

FIG. 7B is a diagram illustrating a modification of the diode driving circuit illustrated in FIG. 7A. Referring to FIG. 7B, the same reference numerals are used to identify parts already described with reference to FIG. 7A, and the description thereof will be therefore omitted. As illustrated in FIG. 7B, one end of the inductor 701 may be connected to the bias current source 111 and the resistor 171, and the other end of the inductor 701 may be connected to the transistor 131.

(Seventh Embodiment)

Figure 8:
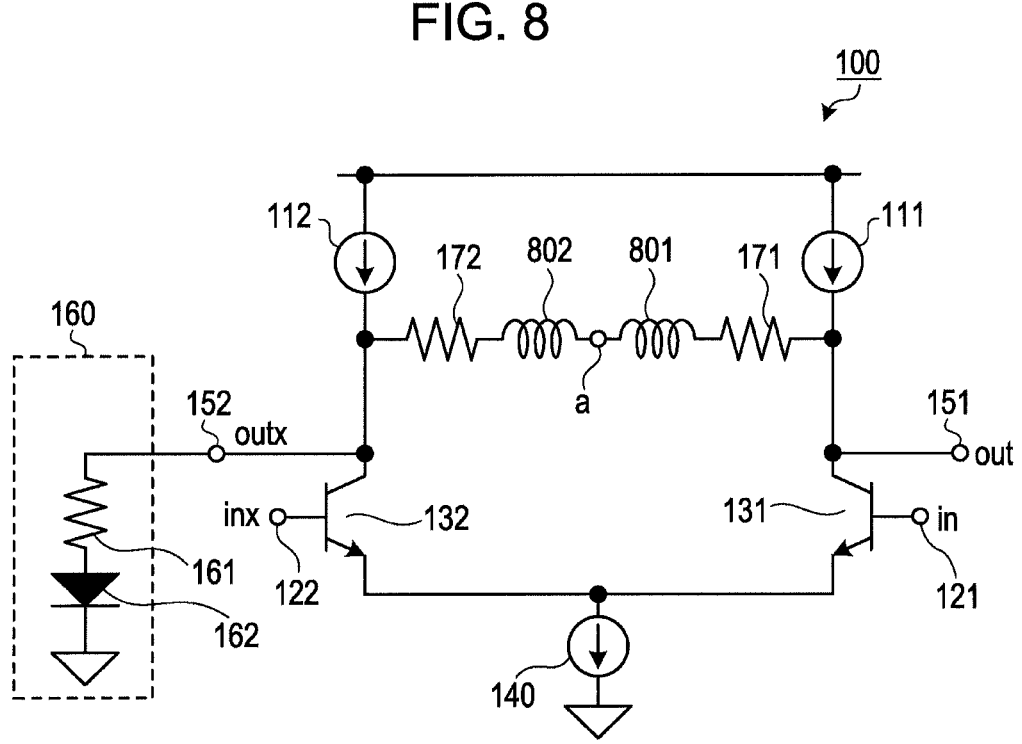
FIG. 8 is a diagram illustrating an exemplary configuration of a diode driving circuit according to a seventh embodiment.

FIG. 8 is a diagram illustrating an exemplary configuration of a diode driving circuit according to the seventh embodiment. Referring to FIG. 8, the same reference numerals are used to identify parts already described with reference to FIG. 1A, and the description thereof will be therefore omitted. The diode driving circuit 100 illustrated in FIG. 8 includes inductors 801 and 802 in addition to the components illustrated in FIG. 1A. One end of the inductor 801 is connected to the resistor 171, and the other end of the inductor 801 is connected to the inductor 802.

One end of the inductor 802 is connected to the resistor 172, and the other end of the inductor 802 is connected to the inductor 801. The inductors 801 and 802 may be integrated into a single inductor. Thus, the inductors 801 and 802 are on a path connecting the output nodes 151 and 152. Since the high-frequency component of a driving signal makes a voltage jump, the diode driving circuit 100 can be operated at a high speed.

Since a current flowing through the inductors 801 and 802 is smaller than that flowing through the inductor 701 illustrated in FIG. 7A, the line width of the inductors 801 and 802 can be reduced and the length of the inductors 801 and 802 can be increased. That is, it is possible to increase an inductance value without changing a footprint in each of the inductors 801 and 802. The degree of a voltage jump made by a high-frequency component can be therefore increased.

(Eighth Embodiment)

Figure 9A:
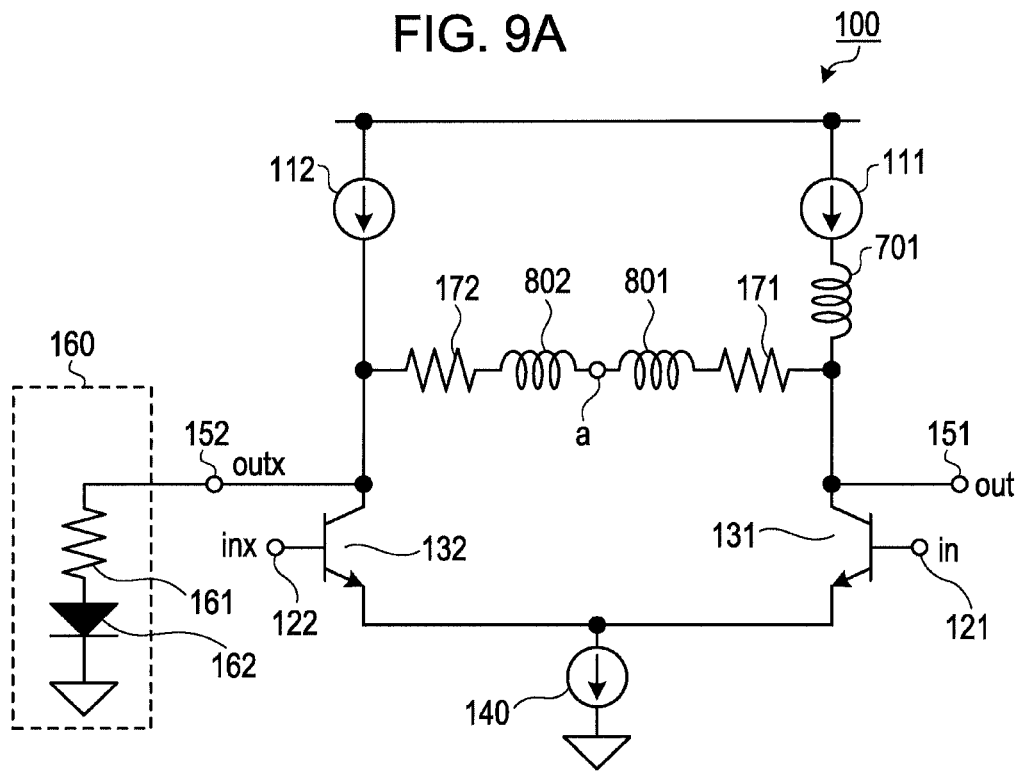
FIG. 9A is a diagram illustrating an exemplary configuration of a diode driving circuit according to an eighth embodiment.

FIG. 9A is a diagram illustrating an exemplary configuration of a diode driving circuit according to the eighth embodiment. Referring to FIG. 9A, the same reference numerals are used to identify parts already described with reference to FIGS. 7A and 8, and the description thereof will be therefore omitted. The diode driving circuit 100 illustrated in FIG. 9A includes the inductors 701, 801, and 802 in addition to the components illustrated in FIG. 1A. Since the high-frequency component of a driving signal can make a bigger voltage jump, the diode driving circuit 100 can be operated at a high speed.

Figure 9B:
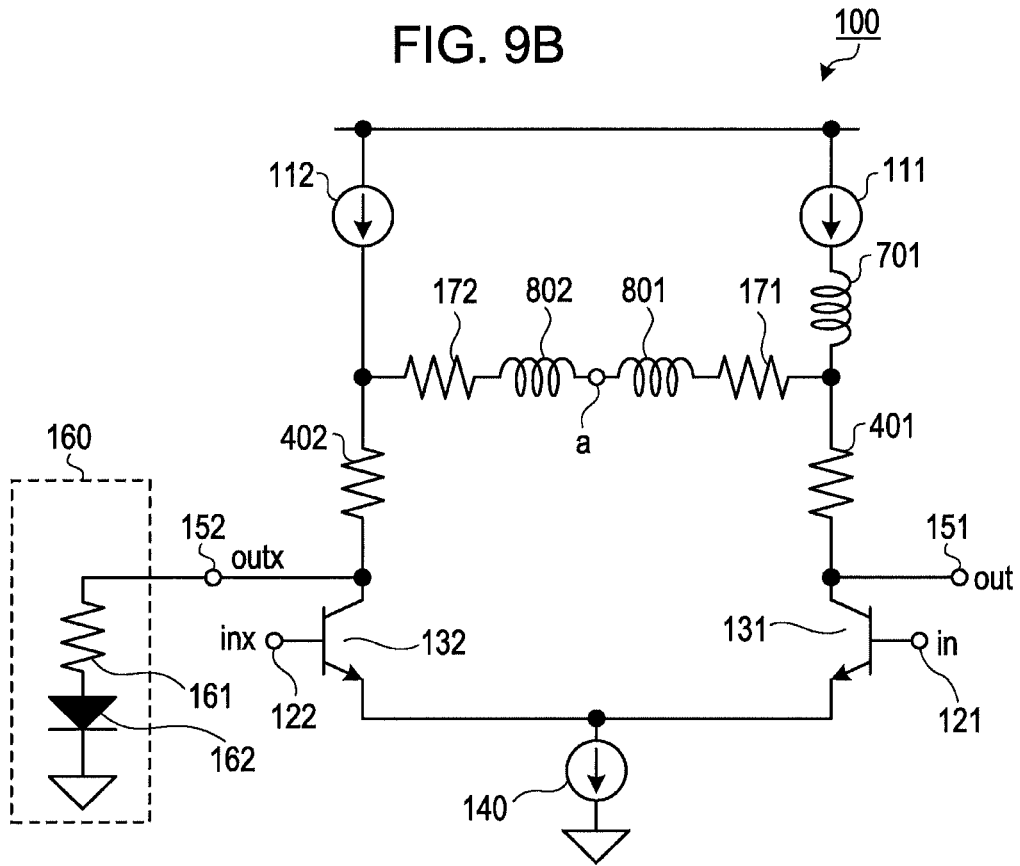
FIG. 9B is a diagram illustrating a modification of the diode driving circuit illustrated in FIG. 9A.

FIG. 9B is a diagram illustrating a modification of the diode driving circuit illustrated in FIG. 9A. Referring to FIG. 9B, the same reference numerals are used to identify parts already described with reference to FIG. 9A, and the description thereof will be therefore omitted. As illustrated in FIG. 9B, in the diode driving circuit 100, each of the termination resistors illustrated in FIG. 9A may be divided into resistors connected in series (see, for example, FIG. 4A).

(Ninth Embodiment)

Figure 10:
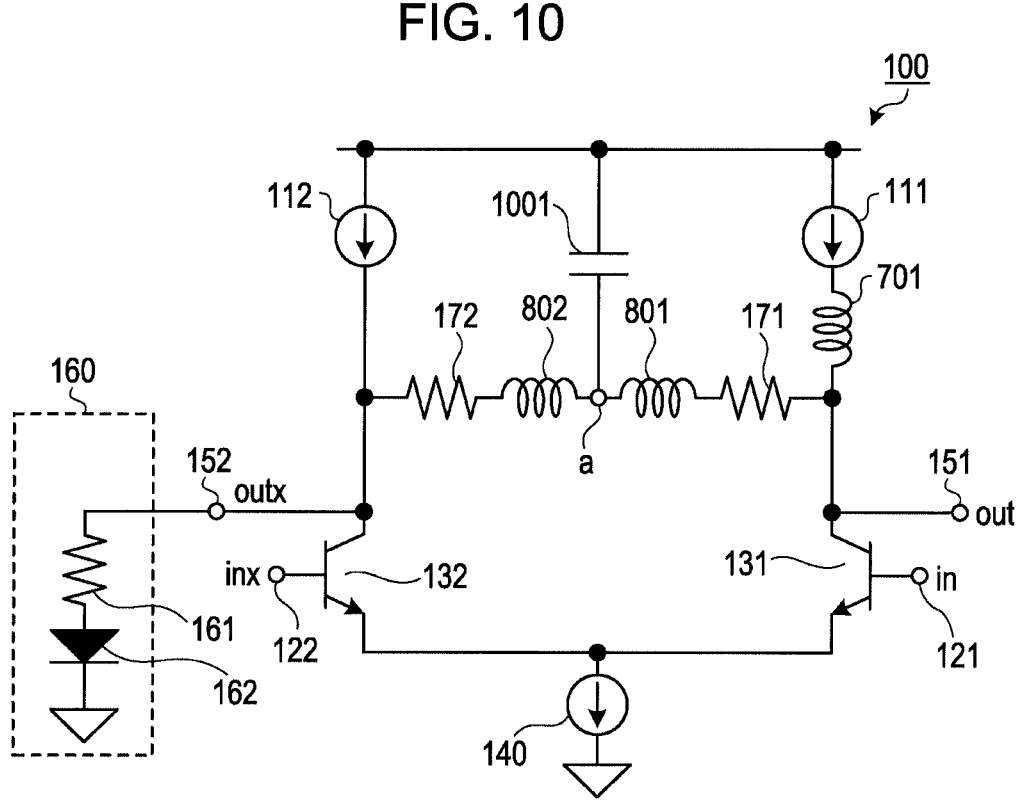
FIG. 10 is a diagram illustrating an exemplary configuration of a diode driving circuit according to a ninth embodiment.

FIG. 10 is a diagram illustrating an exemplary configuration of a diode driving circuit according to the ninth embodiment. Referring to FIG. 10, the same reference numerals are used to identify parts already described with reference to FIG. 9A, and the description thereof will be therefore omitted. The diode driving circuit 100 illustrated in FIG. 10 includes a capacitor 1001 in addition to the components illustrated in FIG. 9A. One end of the capacitor 1001 is connected to the point a between the inductors 801 and 802, and the other end of the capacitor 1001 is connected to a voltage source (not illustrated). As a result, the potential at the point a can be more stable and the output impedance of the output node 151 can be stabilized. It is therefore possible to easily achieve matching between the output impedance of the diode driving circuit 100 and the input impedance of a light-emitting element.

Referring to FIGS. 7A to 10, the inductor 701 or the inductors 701, 801, and 802 are disposed in the diode driving circuit 100 illustrated in FIG. 1A. However, they may be disposed in the diode driving circuit 100 according to any one of the above-described embodiments.

For example, in the diode driving circuit 100 illustrated in FIG. 3A, the inductor 701 may be disposed between the resistor 171 and the transistor 131. For example, in the diode driving circuit 100 illustrated in FIG. 4A, the inductor 701 may be disposed between the resistor 171 and the resistor 401 or between the resistor 401 and the transistor 131.

(Tenth Embodiment)

Figure 11:
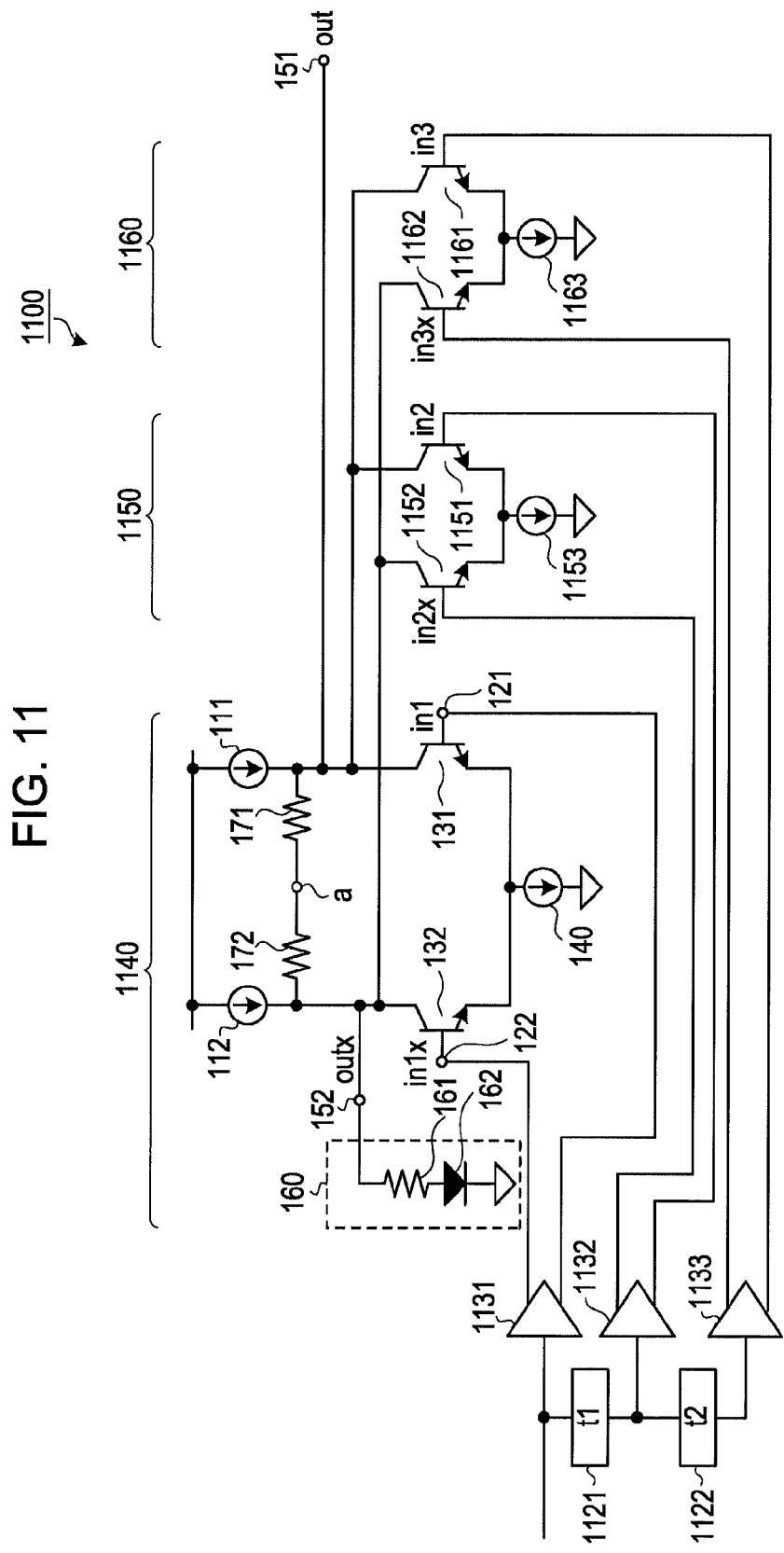
FIG. 11 is a diagram a diagram illustrating an exemplary configuration of a driving circuit according to a tenth embodiment.

FIG. 11 is a diagram illustrating an exemplary configuration of a driving circuit according to the tenth embodiment. Referring to FIG. 11, the same reference numerals are used to identify parts already described with reference to FIG. 1A, and the description thereof will be therefore omitted. A driving circuit 1100 illustrated in FIG. 11 separates an input driving signal into signals, delays one of the signals, and combines these signals. The diode driving circuit 1100 illustrated in FIG. 11 includes delay circuits 1121 and 1122, amplification circuits 1131 to 1133, and diode driving circuits 1140, 1150, and 1160.

A driving signal input into the driving circuit 1100 is separated into driving signals. One of these driving signals is input into the delay circuit 1121, and the other one of them is input into the amplification circuit 1131. The delay circuit 1121 delays the received driving signal by a delay amount t1 and outputs the delayed driving signal to the delay circuit 1122 and the amplification circuit 1132. The delay circuit 1122 delays the driving signal received from the delay circuit 1121 by a delay amount t2 ($\approx$t1) and outputs the delayed driving signal to the amplification circuit 1133.

The amplification circuit 1131 outputs the received driving signal to the diode driving circuit 1140 as a differential signal. The amplification circuit 1132 outputs the driving signal received from the delay circuit 1121 to the diode driving circuit 1150 as a differential signal. The amplification circuit 1133 outputs the driving signal received from the delay circuit 1122 to the diode driving circuit 1160 as a differential signal.

The diode driving circuit 1140 has a configuration similar to the configuration of the diode driving circuit 100 illustrated in FIG. 1A. The diode driving circuit 1140 may have a configuration similar to the configuration of the diode driving circuit 100 according to any one of the above-described embodiments. The diode driving circuit 1140 performs differential amplification on the driving signal output from the amplification circuit 1131. More specifically, a positive-phase signal output from the amplification circuit 1131 is input into the input node 121 (in1), and a negative-phase signal output from the amplification circuit 1131 is input into the input node 122 (in1x).

The diode driving circuit 1150 performs differential amplification on the driving signal output from the amplification circuit 1132. More specifically, the diode driving circuit 1150 is an LTP differential amplification circuit using a part of the diode driving circuit 1140 (for example, the bias current sources 111 and 112), and includes transistors 1151 and 1152 and a modulated current source 1153.

The transistors 1151 and 1152 are, for example, BJTs or FETs. In this embodiment, the transistors 1151 and 1152 are BJTs. A positive-phase signal output from the amplification circuit 1132 is input into the base of the transistor 1151 (in2). The collector of the transistor 1151 is connected between the bias current source 111 in the diode driving circuit 1140 and the transistor 131 in the diode driving circuit 1140. The emitter of the transistor 1151 is connected to the modulated current source 1153.

A negative-phase signal output from the amplification circuit 1132 is input into the base of the transistor 1152 (in2x). The collector of the transistor 1152 is connected between the bias current source 112 in the diode driving circuit 1140 and the transistor 132 in the diode driving circuit 1140. The emitter of the transistor 1152 is connected to the modulated current source 1153. The modulated current source 1153 receives a current from the transistors 1151 and 1152. One end of the modulated current source 1153 is connected to the transistors 1151 and 1152, and the other end of the modulated current source 1153 is connected to the ground.

The diode driving circuit 1160 performs differential amplification on the driving signal output from the amplification circuit 1133. More specifically, the diode driving circuit 1160 is an LTP differential amplification circuit using a part of the diode driving circuit 1140 (for example, the bias current sources 111 and 112), and includes transistors 1161 and 1162 and a modulated current source 1163.

The transistors 1161 and 1162 are, for example, BJTs or FETs. In this embodiment, the transistors 1161 and 1162 are BJTs. A positive-phase signal output from the amplification circuit 1133 is input into the base of the transistor 1161 (in3). The collector of the transistor 1161 is connected between the bias current source 111 in the diode driving circuit 1140 and the transistor 131 in the diode driving circuit 1140. The emitter of the transistor 1161 is connected to the modulated current source 1163.

A negative-phase signal output from the amplification circuit 1133 is input into the base of the transistor 1162 (in3x). The collector of the transistor 1162 is connected between the bias current source 112 in the diode driving circuit 1140 and the transistor 132 in the diode driving circuit 1140. The emitter of the transistor 1162 is connected to the modulated current source 1163. The modulated current source 1163 receives a current from the transistors 1161 and 1162. One end of the modulated current source 1163 is connected to the transistors 1161 and 1162, and the other end of the modulated current source 1163 is connected to the ground.

The driving signals among which there are delay differences made by the delay circuits 1121 and 1122 are power-controlled by the diode driving circuits 1140, 1150, and 1160, are combined, and are then output from the output node 151. Accordingly, the rise and fall portions of the driving signal input into the diode driving circuit 1140 can be corrected (can be emphasized or suppressed) and output to a light-emitting element. This leads to the improvement in the quality of an optical signal generated by the light-emitting element (pre-emphasis).

Using the above-described configuration, it is also possible to reduce the output impedance of the output node 151, symmetrically operate the output nodes 151 and 152, and stabilize an output impedance. It is therefore possible to easily achieve matching between the output impedance of the diode driving circuit 1140 and the input impedance of a light-emitting element and drive the light-emitting element at a high speed. In the driving circuit 1100, a driving signal is separated into three driving signals, but may be separated into two driving signals or four or more driving signals.

(Eleventh Embodiment)

Figure 12:
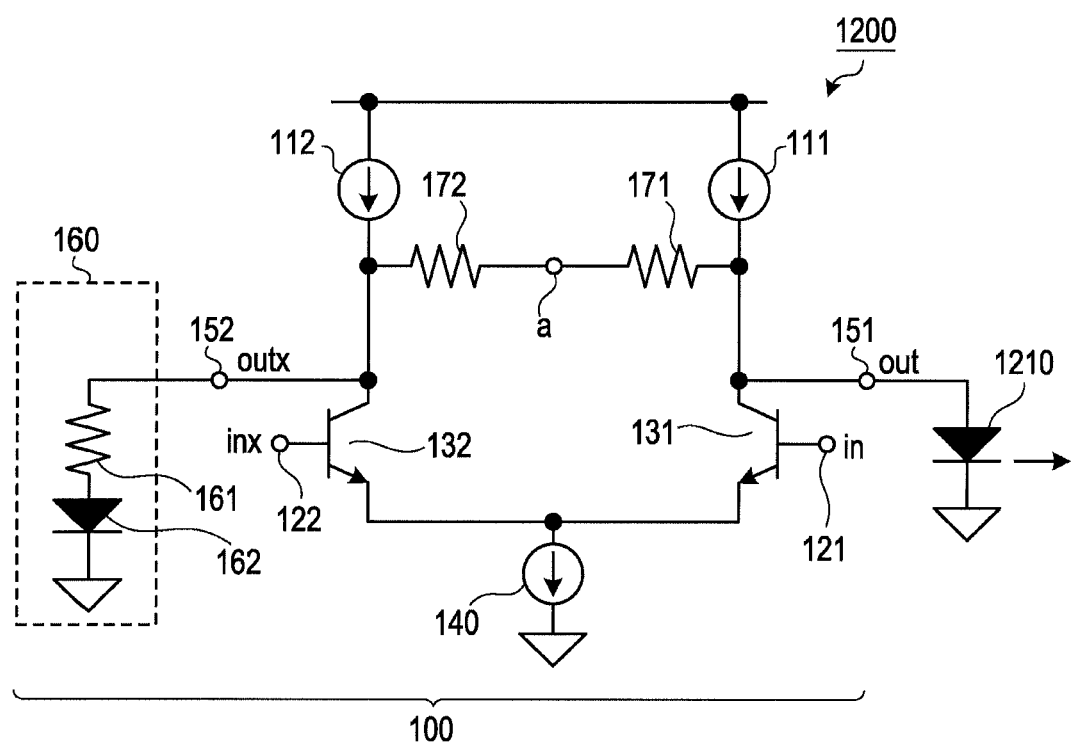
FIG. 12 is a diagram illustrating an exemplary configuration of an optical transmission apparatus according to an eleventh embodiment.

FIG. 12 is a diagram illustrating an exemplary configuration of an optical transmission apparatus according to the eleventh embodiment. As illustrated in FIG. 12, an optical transmission apparatus 1200 according to the eleventh embodiment includes the diode driving circuit 100 and a light-emitting element (light-emitting diode) 1210. In the optical transmission apparatus 1200, when a driving signal is input into the light-emitting element 1210, the light-emitting element 1210 is directly modulated and outputs an optical signal.

More specifically, the diode driving circuit 100 shapes a driving signal, which has been input into the optical transmission apparatus 1200, and outputs the shaped driving signal to the light-emitting element 1210. For example, the diode driving circuit 100 illustrated in FIG. 1A is used. The light-emitting element 1210 is, for example, an LD such as a VCSEL. Upon receiving a driving signal (a positive-phase signal) from the output node 151 in the diode driving circuit 100, the light-emitting element 1210 is driven by anode driving.

It is therefore possible to easily achieve matching between the output impedance of the diode driving circuit 100 and the input impedance of the light-emitting element 1210. Even if a high-speed driving signal is input into the diode driving circuit 100 to drive the light-emitting element 1210 at a high speed, the reflection of the driving signal at the point of connection between the diode driving circuit 100 and the light-emitting element 1210 can be suppressed and the light-emitting element 1210 can be driven at a high speed.

In the optical transmission apparatus 1200, the diode driving circuit 100 illustrated in FIG. 1A is used. However, the diode driving circuit 100 according to any one of the above-described embodiments can be used. Instead of the diode driving circuit 100 illustrated in FIG. 12, the driving circuit 1100 illustrated in FIG. 11 may be used in the optical transmission apparatus 1200.

(Exemplary Operation of Diode Driving Circuit)

Next, an exemplary operation of the diode driving circuit 100 will be described. In this embodiment, an exemplary operation of the diode driving circuit 100 illustrated in FIG. 1A will be described.

Figure 13A:
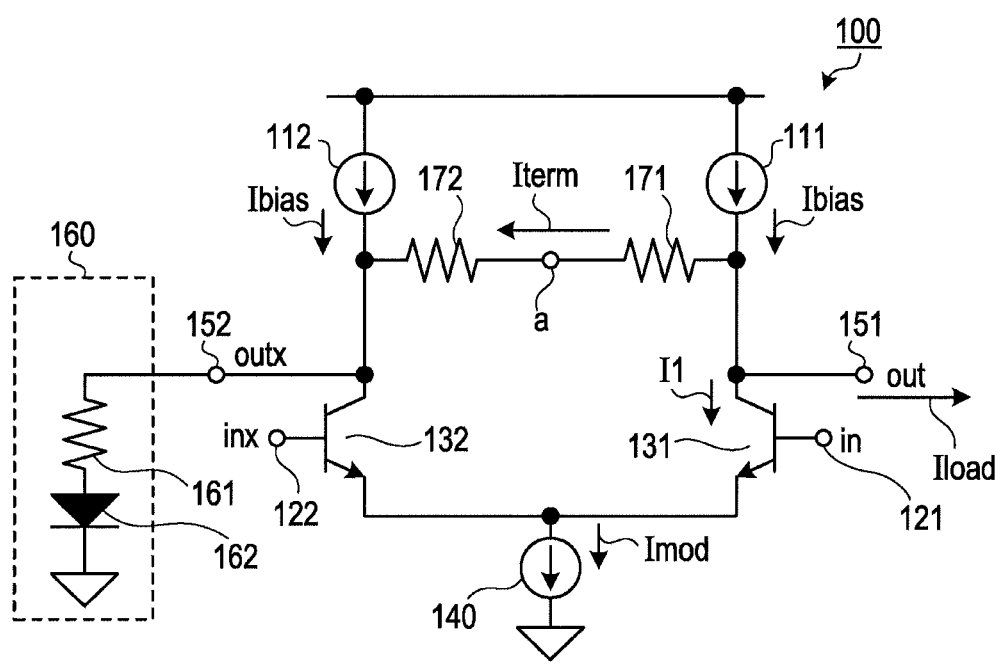
FIG. 13A is a diagram illustrating a first exemplary operation of a diode driving circuit according to the first embodiment.

FIGS. 13A to 13E are diagrams illustrating exemplary operations of a diode driving circuit according to the first embodiment. Referring to FIG. 13A, the same reference numerals are used to identify parts already described with reference to FIG. 1A, and the description thereof will be therefore omitted. As illustrated in FIG. 13A, a current that flows from the bias current sources 111 and 112 is defined as Ibias, a current passing through the termination resistors (the resistors 171 and 172) is defined as Iterm, a current to be switched by the transistor 131 is defined as I1, a current passing through the modulated current source 140 is defined as Imod, and a current output from the output node 151 is defined as Iload.

Figure 13B:
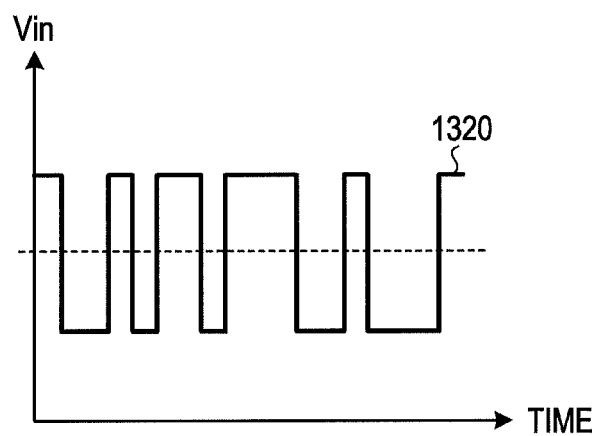
FIG. 13B is a diagram illustrating a second exemplary operation of a diode driving circuit according to the first embodiment.
Figure 13C:
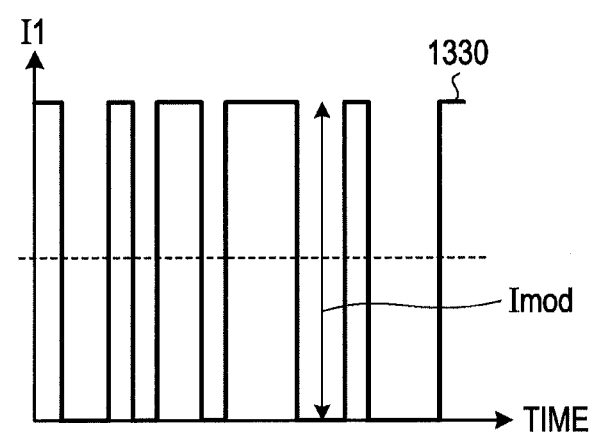
FIG. 13C is a diagram illustrating a third exemplary operation of a diode driving circuit according to the first embodiment.

A waveform 1320 illustrated in FIG. 13B represents an input signal input into the input node 121. Referring to FIG. 13B, a vertical axis represents the voltage of the input signal. A waveform 1330 illustrated in FIG. 13C represents the current I1 to be switched by the transistor 131. The transistor 131 is turned on/off in accordance with the input signal represented by the waveform 1330 and a current based on a modulation current is switched. The amplitude of the current I1 is represented by Imod.

Figure 13D:
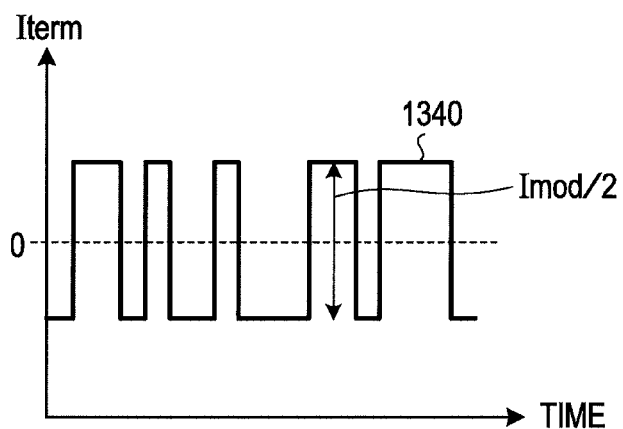
FIG. 13D is a diagram illustrating a fourth exemplary operation of a diode driving circuit according to the first embodiment.
Figure 13E:
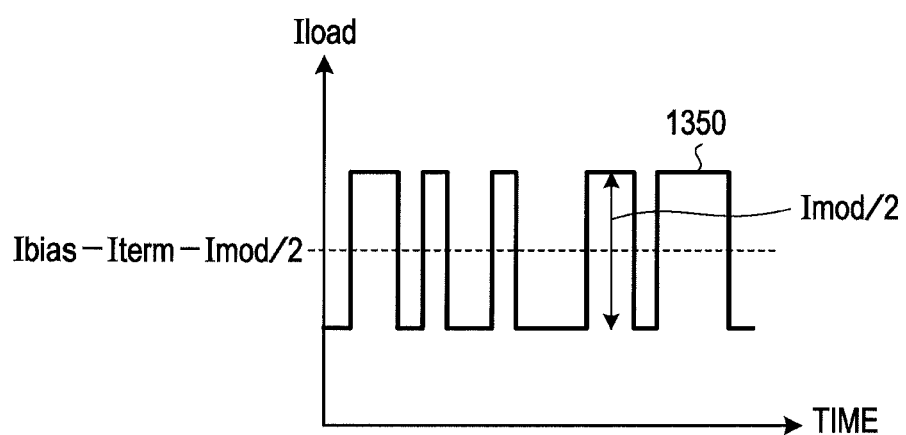
FIG. 13E is a diagram illustrating a fifth exemplary operation of a diode driving circuit according to the first embodiment.

A waveform 1340 illustrated in FIG. 13D represents the current Iterm passing through the termination resistors (the resistors 171 and 172). The amplitude of the current Iterm is Imod/2 (the half of the amplitude of the modulation current). A waveform 1350 illustrated in FIG. 13E represents the current Iload output from the output node 151. The amplitude of the current Iload is Imod/2 (the half of the amplitude of the modulation current). The DC level of the amplitude of the current Iload is obtained by subtracting a DC current passing through the termination resistors from a bias current, that is, is obtained with the expression of the current Ibias—the current Iterm—Imod/2.

Figure 14A:
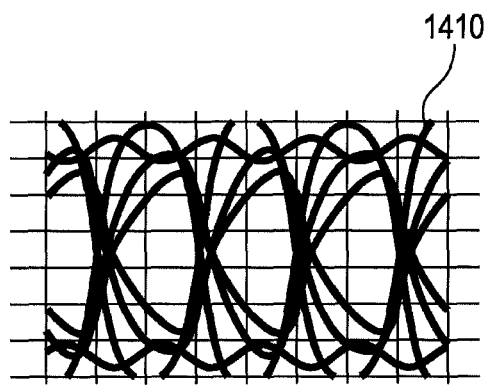
FIG. 14A is a diagram illustrating a first example of impedance matching at the time of high-speed driving.
Figure 14B:
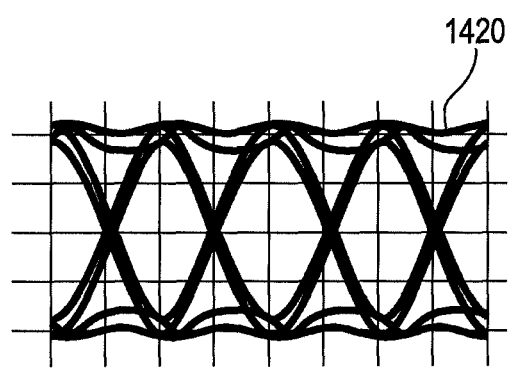
FIG. 14B is a diagram illustrating a second example of impedance matching at the time of high-speed driving.

FIGS. 14A and 14B are diagrams illustrating impedance matching at the time of high-speed driving. Referring to FIG. 14A, a current waveform 1410 represents a high-speed driving signal generated by a diode driving circuit in the related art. As represented by the current waveform 1410, the generated driving signal is unstable, because the impedance of a termination resistor in a diode driving circuit in the related art becomes high and impedance matching is not achieved.

Referring to FIG. 14B, a current waveform 1420 represents a high-speed driving signal generated by the diode driving circuit 100. As represented by the current waveform 1420, a stable driving signal can be obtained, because a termination resistor in the diode driving circuit 100 can be stable in terms of AC and impedance matching can be achieved.

<Exemplary Cathode Driving Configuration>

Next, an exemplary cathode driving configuration will be described. In the following embodiments, the same reference numerals are used to identify parts already described in the above-described embodiments. In twelfth to fourteenth embodiments, a termination ground is directly connected to the ground. In fifteenth to seventeenth embodiments, a termination ground is grounded using a capacitor.

(Twelfth Embodiment)

Figure 15A:
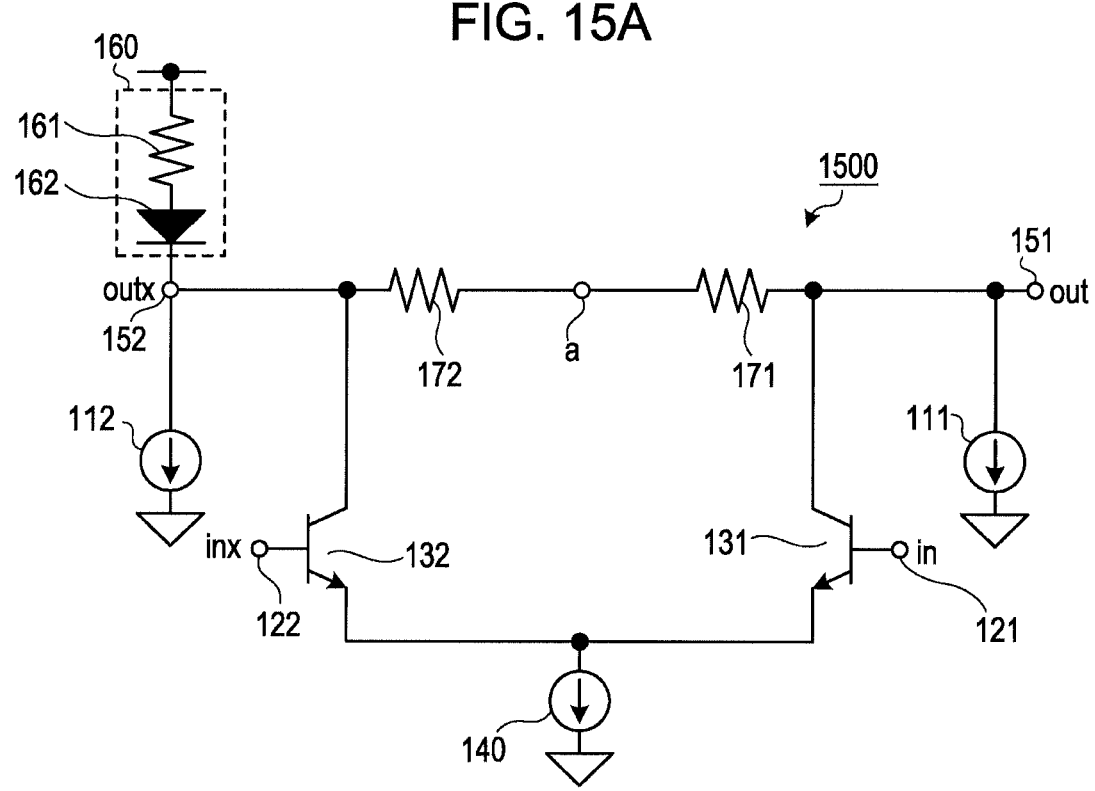
FIG. 15A is a diagram illustrating an exemplary configuration of a diode driving circuit according to a twelfth embodiment.

In the twelfth embodiment, an exemplary configuration in which a termination ground is virtually grounded will be described. FIG. 15A is a diagram illustrating an exemplary configuration of a diode driving circuit according to the twelfth embodiment. In a diode driving circuit 1500 illustrated in FIG. 15A, a current source connection point is between a point that is stable in terms of DC and an output node. The diode driving circuit 1500 includes the bias current sources 111 and 112, the input nodes 121 and 122, the transistors 131 and 132, the modulated current source 140, the output nodes 151 and 152, the dummy load 160, and the resistors 171 and 172.

The input nodes 121 and 122 are input nodes of a differential pair into which a differential driving signal is input. More specifically, a positive-phase signal included in the differential driving signal is input into the input node 121 (in), and a negative-phase signal included in the differential driving signal is input into the input node 122 (inx).

One end of the bias current source 111 is connected to the output node 151, and the other end of the bias current source 111 is connected to the ground. One end of the bias current source 112 is connected to the output node 152, and the other end of the bias current source 112 is connected to the ground.

The base of the transistor 131 is connected to the input node 121, the collector of the transistor 131 is connected to the output node 151, and the emitter of the transistor 131 is connected to the modulated current source 140. The base of the transistor 132 is connected to the input node 122, the collector of the transistor 132 is connected to the output node 152, and the emitter of the transistor 132 is connected to the modulated current source 140. The modulated current source 140 receives a current from the transistors 131 and 132. One end of the modulated current source 140 is connected to the transistors 131 and 132, and the other end of the modulated current source 140 is connected to the ground.

The output nodes 151 and 152 are output nodes of a differential pair from which a differential driving signal is output. The output node 151 is connected to a light-emitting element that is a driving target. The output node 151 outputs the positive-phase signal included in the differential driving signal to the light-emitting element (out). The output node 152 is connected to the dummy load 160. The output node 152 outputs the negative-phase signal included in the differential driving signal to the dummy load 160 (outx).

The dummy load 160 has a load equal to the load of a driving target (light-emitting element) connected to the output node 151, and includes a resistor 161 and a diode 162. One end of the resistor 161 is connected to a voltage source (not illustrated), and the other end of the resistor 161 is connected to the anode of the diode 162. The anode of the diode 162 is connected to the resistor 161 and the cathode of the diode 162 is connected to the output node 152. The diode 162 has the same diode characteristic as that of a light-emitting element connected to the output node 151.

One end of the resistor 171 is connected to the output node 151, and the other end of the resistor 171 is connected to the resistor 172. One end of the resistor 172 is connected to the output node 152, and the other end of the resistor 172 is connected to the resistor 171. A single resistor may function as the resistors 171 and 172.

As viewed from the output node 151, the resistor 171 and the bias current source 111 are connected in parallel. Accordingly, the total resistance value of the bias current source 111 and the resistor 171 as viewed from the output node 151 is the reciprocal of $(1/\infty)+(1/R1)$ $(1/R1)$ where $\infty$ (infinity) represents the resistance value of the bias current source 111 and R1 represents the resistance value of the resistor 171.

Accordingly, even if the resistance value of the bias current source 111 is large, it is possible to easily achieve matching between the output impedance of the diode driving circuit 1500 and the input impedance of the light-emitting element connected to the output node 151 using the resistance value R1 of the resistor 171. For example, by making the resistance value R1 of the resistor 171 equal to the resistance value of the light-emitting element, it is possible to achieve matching between the output impedance of the diode driving circuit 1500 and the input impedance of the light-emitting element.

The resistors 171 and 172 are on a path connecting the output nodes 151 and 152. By connecting the output node 151 to the light-emitting element and connecting the dummy load 160 to the dummy load 160, a load on a positive-phase side and a load on a negative-phase side become equal to each other. Accordingly, the output nodes 151 and 152 can be symmetrically operated (the potentials of the output nodes 151 and 152 can be opposite in polarity). As a result, the point a (termination ground) between the resistors 171 and 172 can be virtually connected to the ground (the resistors 171 and 172 can be at the same potential in terms of AC).

As described previously, in the diode driving circuit 1500, since the termination resistor is connected to the termination ground, the output impedance of the diode driving circuit 1500 can be reduced regardless of the high resistance of the bias current source 111. In addition, in the diode driving circuit 1500, since the dummy load 160 for a driving target is connected to one of the output nodes (the output node 152), the output nodes 151 and 152 can be symmetrically operated and the output impedance of the diode driving circuit 1500 can be stabilized.

It is therefore possible to easily achieve matching between the output impedance of the diode driving circuit 1500 and the input impedance of the light-emitting element and prevent the reflection of a driving signal at a point of connection between the diode driving circuit 1500 and the light-emitting element. Accordingly, the light-emitting element can be driven at a high speed.

Furthermore, since there is no resistor between the bias current source 111 and the output node 151, a voltage drop can be suppressed. As a result, the flexibility of voltage design for the bias current sources 111 and 112 can be improved and circuit design can be performed using a low voltage source.

Figure 15B:
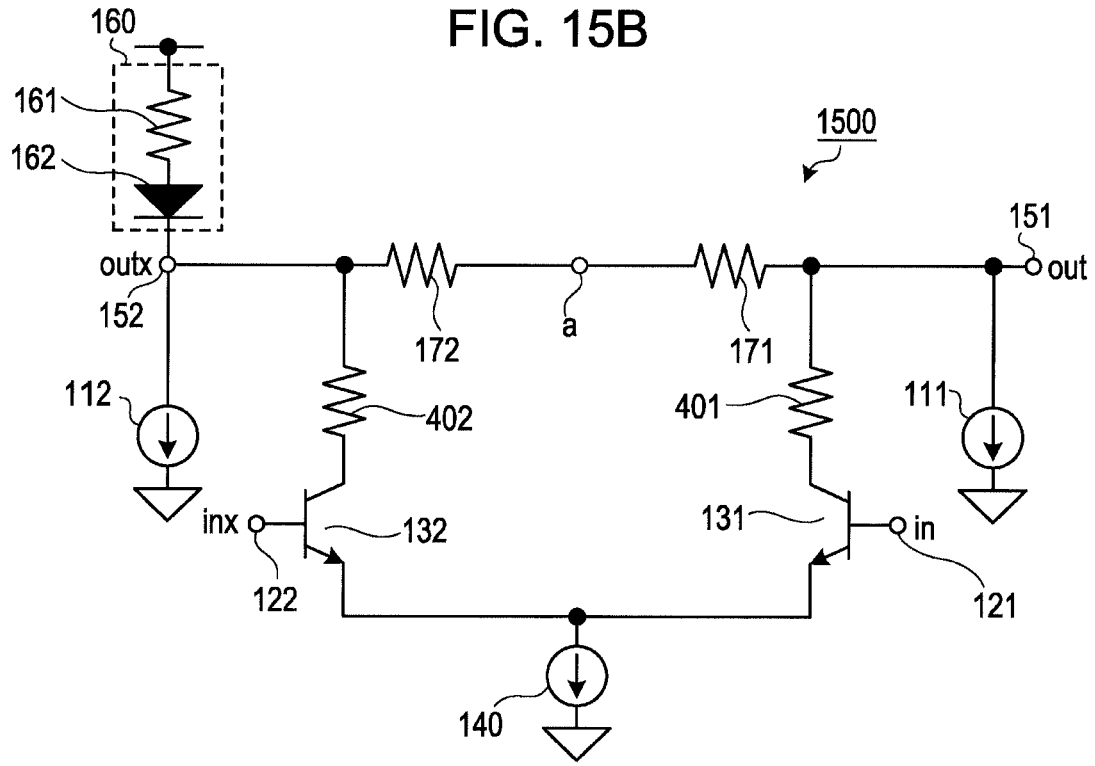
FIG. 15B is a diagram illustrating a first modification of a diode driving circuit according to the twelfth embodiment.

FIG. 15B is a diagram illustrating a first modification of a diode driving circuit according to the twelfth embodiment. In the diode driving circuit 1500 illustrated in FIG. 15B, a current source connection point is between a point that is stable in terms of DC and a point between divided resistors. Referring to FIG. 15B, in the diode driving circuit 1500, each termination resistor illustrated in FIG. 15A is divided into resistors connected in series. More specifically, in addition to the components illustrated in FIG. 15A, the resistors 401 and 402 are disposed. The resistor 401 is disposed between the output node 151 and the transistor 131. The resistor 402 is disposed between the output node 152 and the transistor 132.

Thus, by connecting one of the resistors into which a termination resistor is divided to the termination ground (the point a), it is possible to easily achieve matching between the output impedance of the diode driving circuit 1500 and the input impedance of a light-emitting element.

Figure 15C:
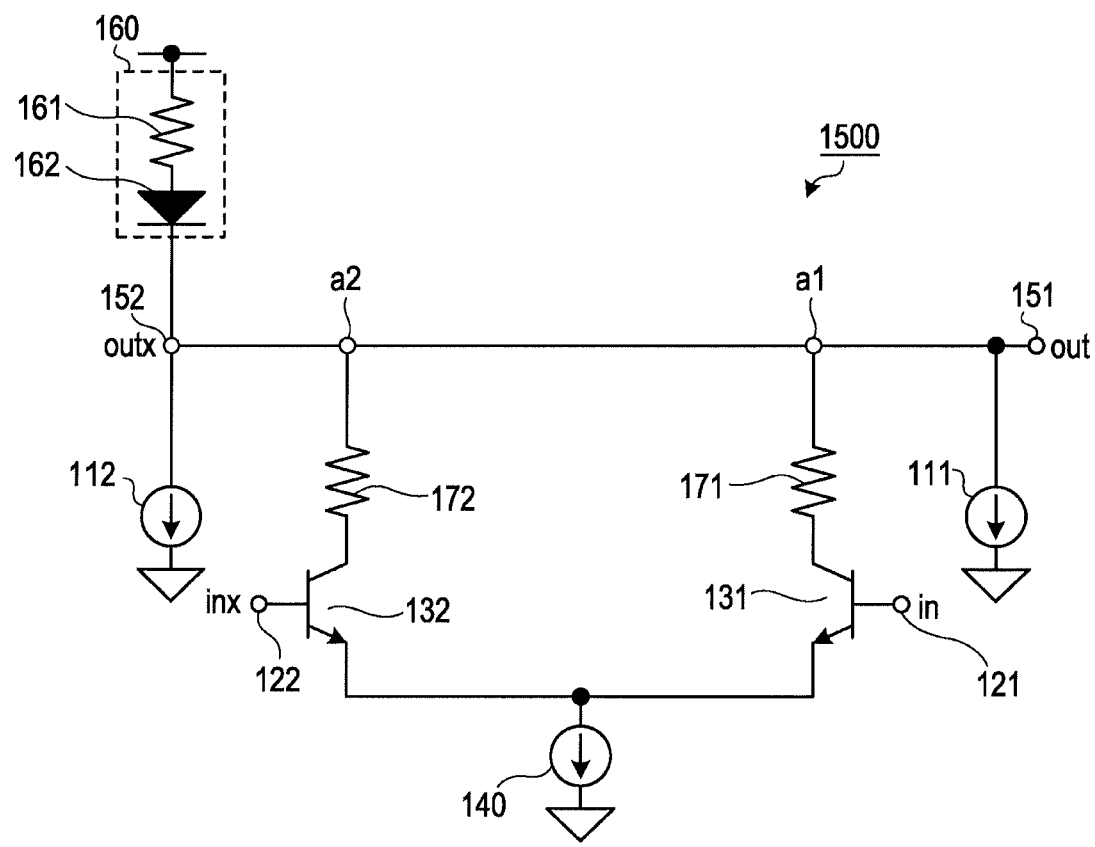
FIG. 15C is a diagram illustrating a second modification of a diode driving circuit according to the twelfth embodiment.

FIG. 15C is a diagram illustrating a second modification of a diode driving circuit according to the twelfth embodiment.

In the diode driving circuit 1500 illustrated in FIG. 15C, a current source connection point is between a point that is stable in terms of DC and a termination ground. One end of the bias current source 111 is connected to one end of the resistor 171 on a path connecting the output nodes 151 and 152, and the other end of the bias current source 111 is connected to the ground. One end of the bias current source 112 is connected to one end of the resistor 172, and the other end of the bias current source 112 is connected to the ground. Terminating grounds are represented by points *a*1 and *a*2 on the path connecting the output nodes 151 and 152.

Accordingly, even if the resistance value of the bias current source 111 is large, it is possible to easily achieve matching between the output impedance of the diode driving circuit 1500 and the input impedance of a diode to be driven using the resistance value R1 of the resistor 171. As a result, the diode can be driven at a high speed.

(Thirteenth Embodiment)

Figure 16A:
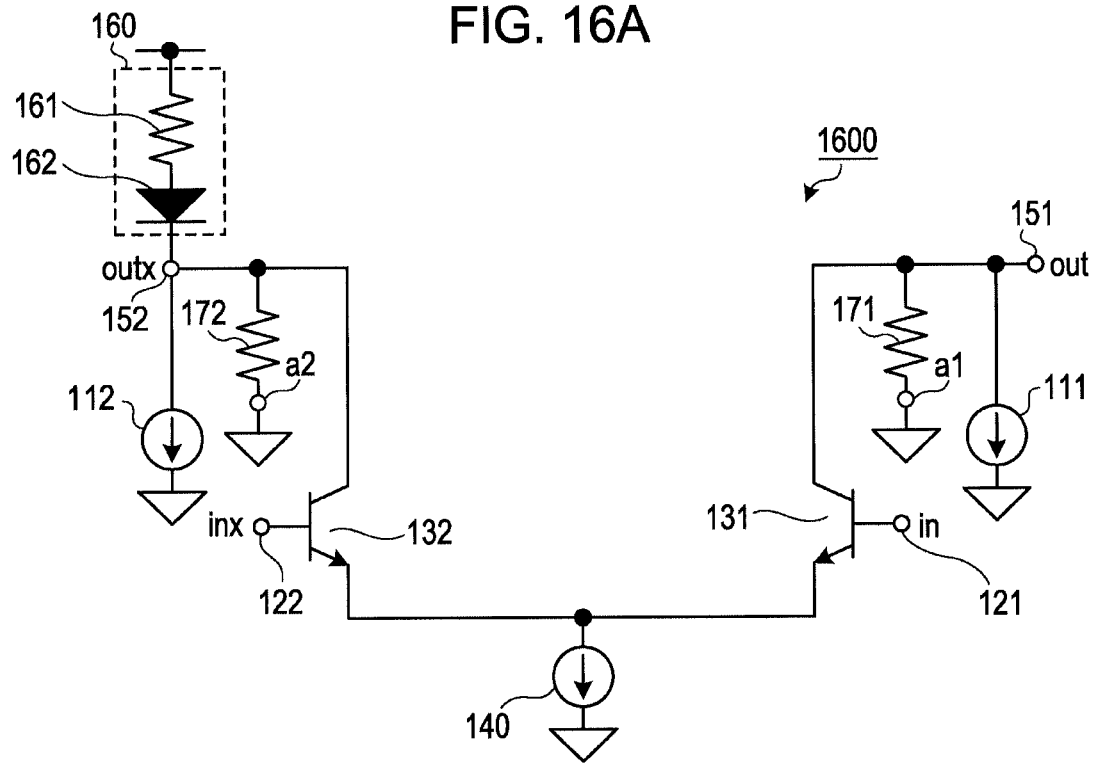
FIG. 16A is a diagram illustrating an exemplary configuration of a diode driving circuit according to a thirteenth embodiment.

In the thirteenth embodiment, an exemplary configuration in which a termination ground is directly connected to the ground will be described. FIG. 16A is a diagram illustrating an exemplary configuration of a diode driving circuit according to the thirteenth embodiment. In a diode driving circuit 1600 illustrated in FIG. 16A, a current source connection point is between a point that is stable in terms of DC and an output node, one ends of the resistors 171 and 172 illustrated in FIG. 15A are connected to the output nodes 151 and 152, respectively, and the other ends of the resistors 171 and 172 are connected to the ground. Terminating grounds (the points *a*1 and *a*2) are directly grounded.

As viewed from the output node 151, the resistor 171 and the bias current source 111 are connected in parallel. Accordingly, even if the resistance value of the bias current source 111 is large, it is possible to easily achieve matching between the output impedance of the diode driving circuit 1600 and the input impedance of a light-emitting element connected to the output node 151 using the resistance value R1 of the resistor 171.

Figure 16B:
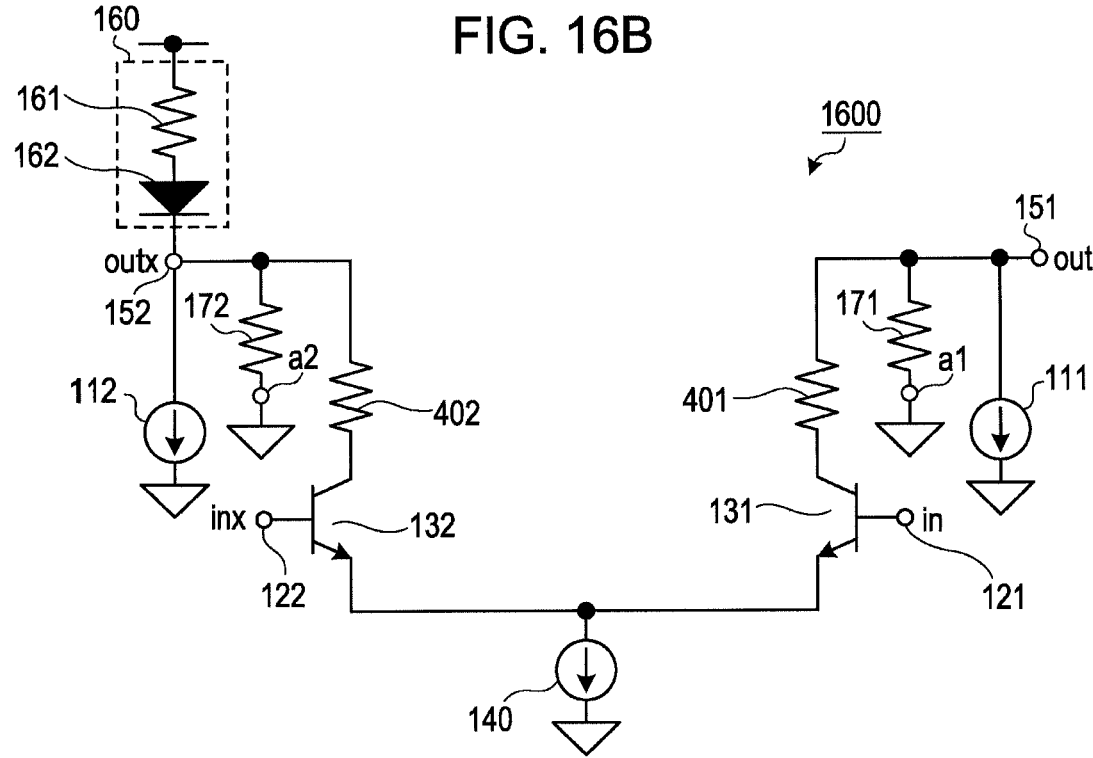
FIG. 16B is a diagram illustrating a first modification of a diode driving circuit according to the thirteenth embodiment.

FIG. 16B is a diagram illustrating a first modification of a diode driving circuit according to the thirteenth embodiment. In the diode driving circuit 1600 illustrated in FIG. 16B, a current source connection point is between a point that is stable in terms of DC and a point between divided resistors. The diode driving circuit 1600 illustrated in FIG. 16B includes the resistors 401 and 402 each obtained by dividing a termination resistor into resistors connected in series. The resistor 401 is disposed between the output node 151 and the transistor 131. The resistor 402 is disposed between the output node 152 and the transistor 132.

In the diode driving circuit 1600, one ends of the resistors 171 and 172 are connected to the output nodes 151 and 152, respectively, the other ends of the resistors 171 and 172 are connected to the ground, and the termination grounds (the points *a*1 and *a*2) are directly grounded. As viewed from the output node 151, the resistor 171 and the bias current source 111 are connected in parallel. Accordingly, even if the resistance value of the bias current source 111 is large, it is possible to easily achieve matching between the output impedance of the diode driving circuit 1600 and the input impedance of a light-emitting element connected to the output node 151 using the resistance value R1 of the resistor 171. By connecting one of the resistors into which a termination resistor is divided to the termination ground (the point *a*1 or *a*2), it is possible to easily achieve matching between the output impedance of the diode driving circuit 1600 and the input impedance of a light-emitting element.

(Fourteenth Embodiment)

Figure 17A:
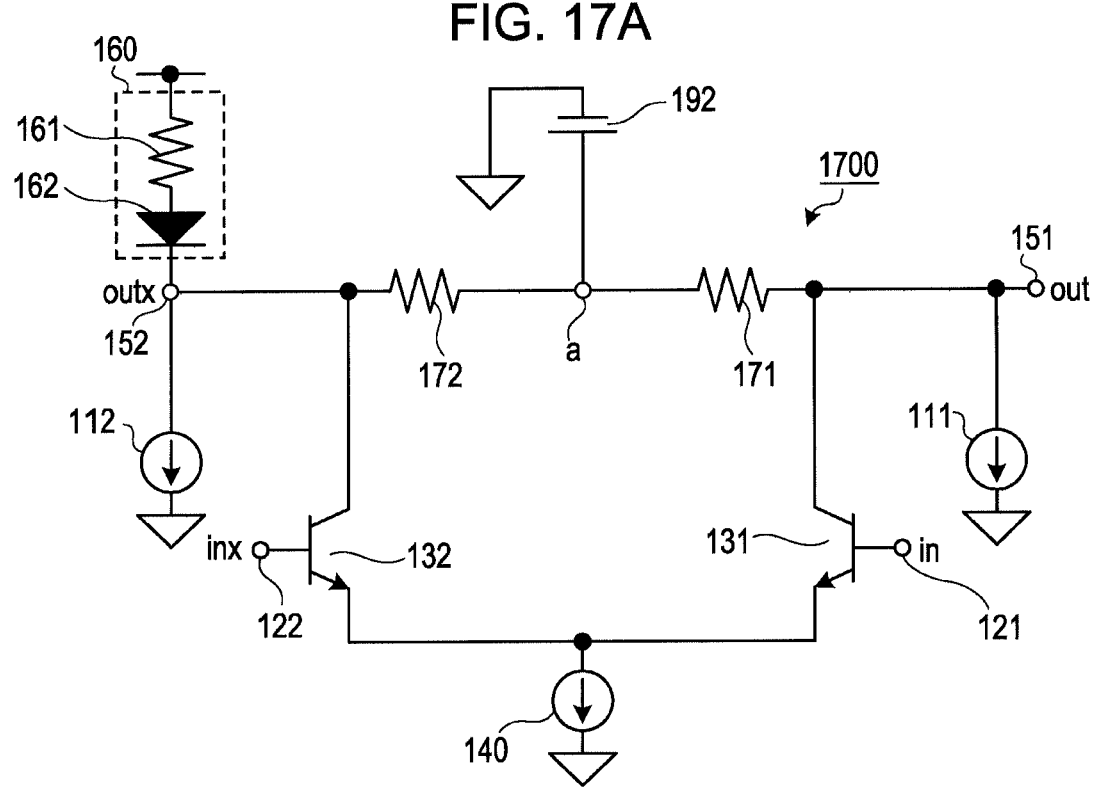
FIG. 17A is a diagram illustrating an exemplary configuration of a diode driving circuit according to a fourteenth embodiment.

In the fourteenth embodiment, an exemplary configuration in which a termination ground is connected to a voltage supply will be described. FIG. 17A is a diagram illustrating an exemplary configuration of a diode driving circuit according to the fourteenth embodiment. In a diode driving circuit 1700 illustrated in FIG. 17A, a current source connection point is between a point that is stable in terms of DC and an output node. The diode driving circuit 1700 includes the voltage supply 192 as an adjustment element in addition to the components illustrated in FIG. 15A. One end of the voltage supply 192 is connected to the ground, and the other end of the voltage supply 192 is connected to the point a (the termination ground). As a result, a bias current can be changed and a direct current passing through the resistors 171 and 172 can be controlled.

Figure 17B:
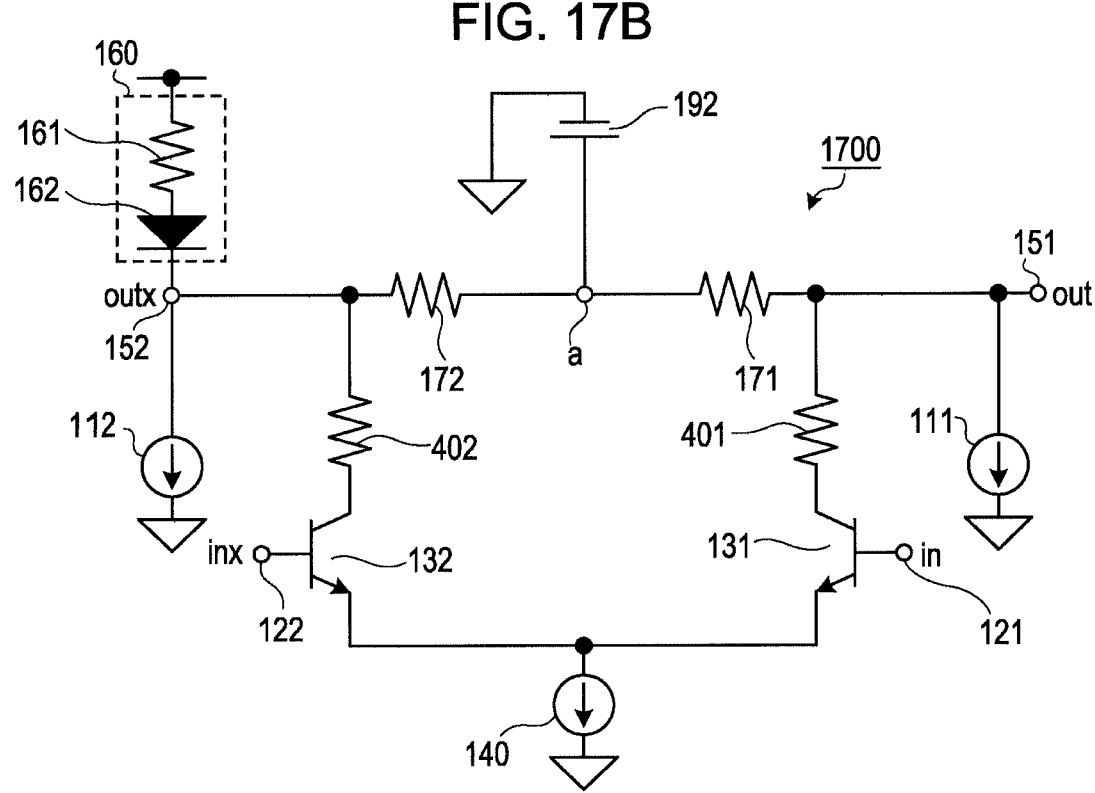
FIG. 17B is a diagram illustrating a first modification of a diode driving circuit according to the fourteenth embodiment.

FIG. 17B is a diagram illustrating a first modification of a diode driving circuit according to the fourteenth embodiment. In the diode driving circuit 1700 illustrated in FIG. 17B, a current source connection point is between a point that is stable in terms of DC and a point between divided resistors. The diode driving circuit 1700 includes the voltage supply 192 as an adjustment element in addition to the components illustrated in FIG. 15B. One end of the voltage supply 192 is connected to the ground, and the other end of the voltage supply 192 is connected to the point a (the termination ground). As a result, a bias current can be changed and a direct current passing through the resistors 171 and 172 can be controlled.

(Fifteenth Embodiment)

Figure 18A:
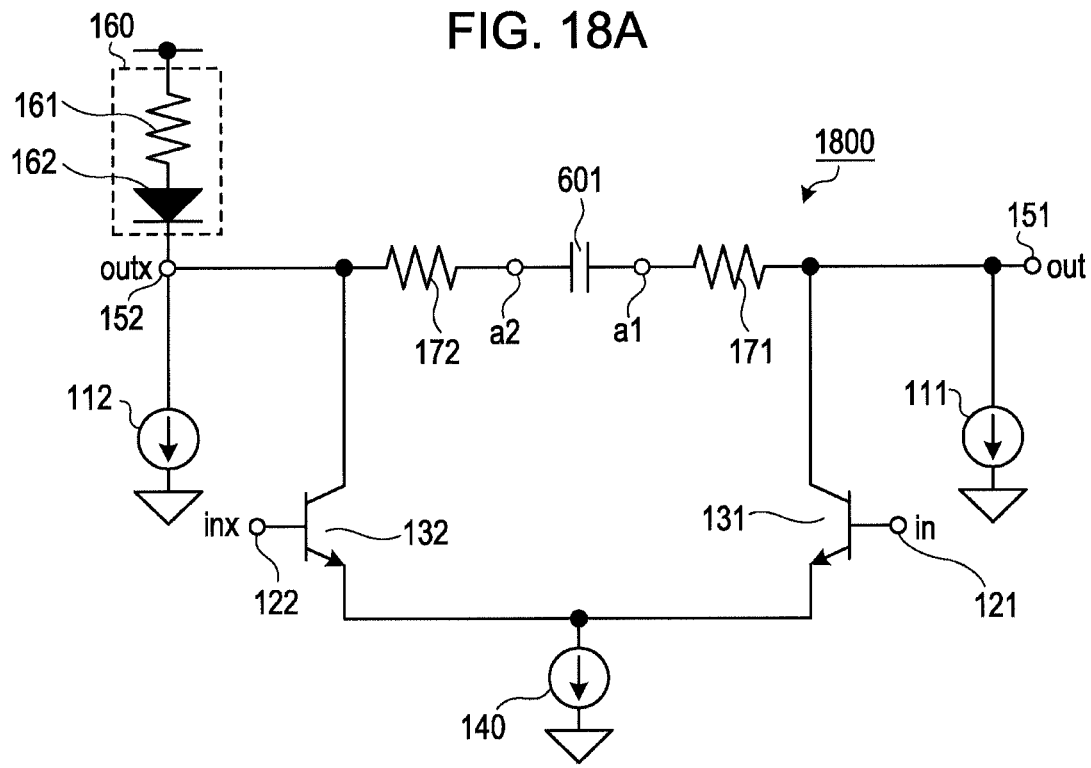
FIG. 18A is a diagram illustrating an exemplary configuration of a diode driving circuit according to a fifteenth embodiment.

In the fifteenth embodiment, an exemplary configuration in which a termination ground is virtually grounded will be described. FIG. 18A is a diagram illustrating an exemplary configuration of a diode driving circuit according to the fifteenth embodiment. In a diode driving circuit 1800 illustrated in FIG. 18A, a current source connection point is between a point that is stable in terms of DC and an output node. The diode driving circuit 1800 includes the capacitor 601 in addition to the components illustrated in FIG. 15A.

The capacitor 601 is disposed between the resistors 171 and 172, and is on a path connecting the output nodes 151 and 152. By disposing the dummy load 160 and symmetrically operating the output nodes 151 and 152, the points *a*1 and *a*2 on both sides of the capacitor 601 can be termination grounds that have the same potential in terms of AC. As a result, the output impedance of the output node 151 can be stabilized. It is therefore possible to easily achieve matching between the output impedance of the diode driving circuit 1800 and the input impedance of a light-emitting element.

Figure 18B:
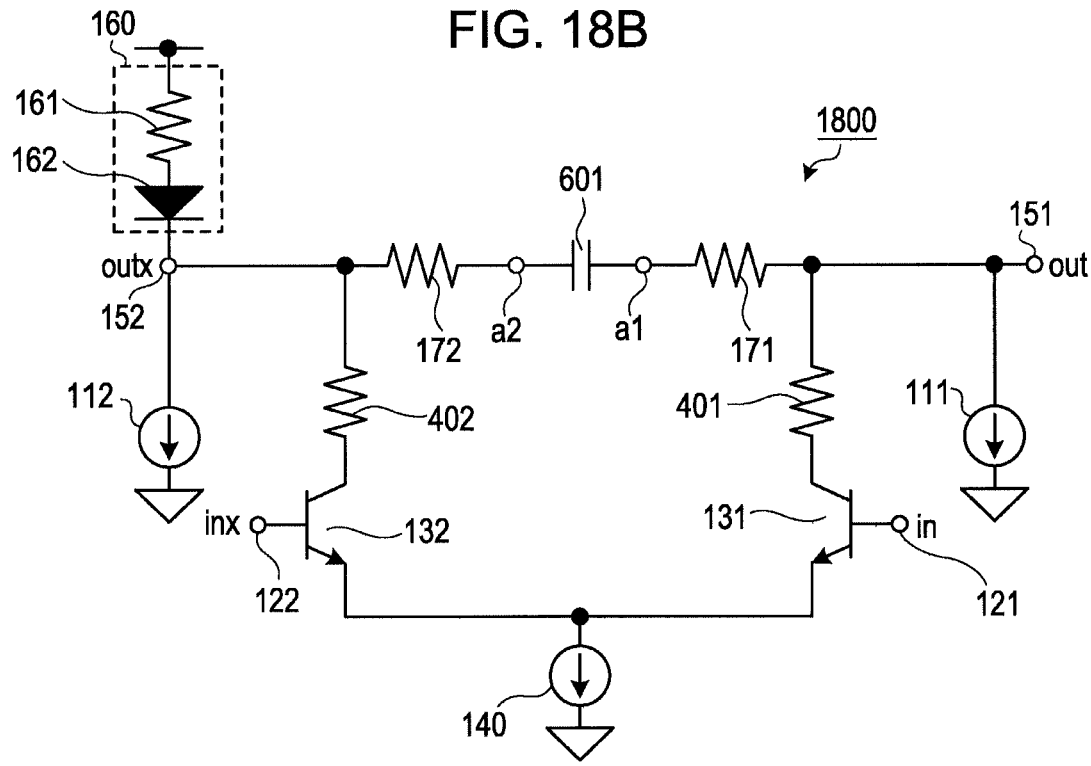
FIG. 18B is a diagram illustrating a first modification of a diode driving circuit according to the fifteenth embodiment.

FIG. 18B is a diagram illustrating a first modification of a diode driving circuit according to the fifteenth embodiment. In the diode driving circuit 1800 illustrated in FIG. 18B, a current source connection point is between a point that is stable in terms of DC and a point between divided resistors. The diode driving circuit 1800 includes the capacitor 601 in addition to the components illustrated in FIG. 15B.

In the diode driving circuit 1800 illustrated in FIG. 18B, each termination resistor illustrated in FIG. 18A is divided into resistors connected in series. More specifically, the diode driving circuit 1800 includes the resistors 401 and 402 in addition to the components illustrated in FIG. 18A. The resistor 401 is disposed between the output node 151 and the transistor 131. The resistor 402 is disposed between the output node 152 and the transistor 132. Thus, by connecting one of the resistors into which a termination resistor is divided to the ground, it is possible to easily achieve matching between the output impedance of the diode driving circuit 1800 and the input impedance of a light-emitting element.

The capacitor 601 is disposed between the resistors 171 and 172, and the points $a1$ and $a2$ on both sides of the capacitor 601 can be termination grounds having the same potential in terms of AC. As a result, the output impedance of the output node 151 can be stabilized. It is therefore possible to easily achieve matching between the output impedance of the diode driving circuit 1800 and the input impedance of a light-emitting element.

Figure 18C:
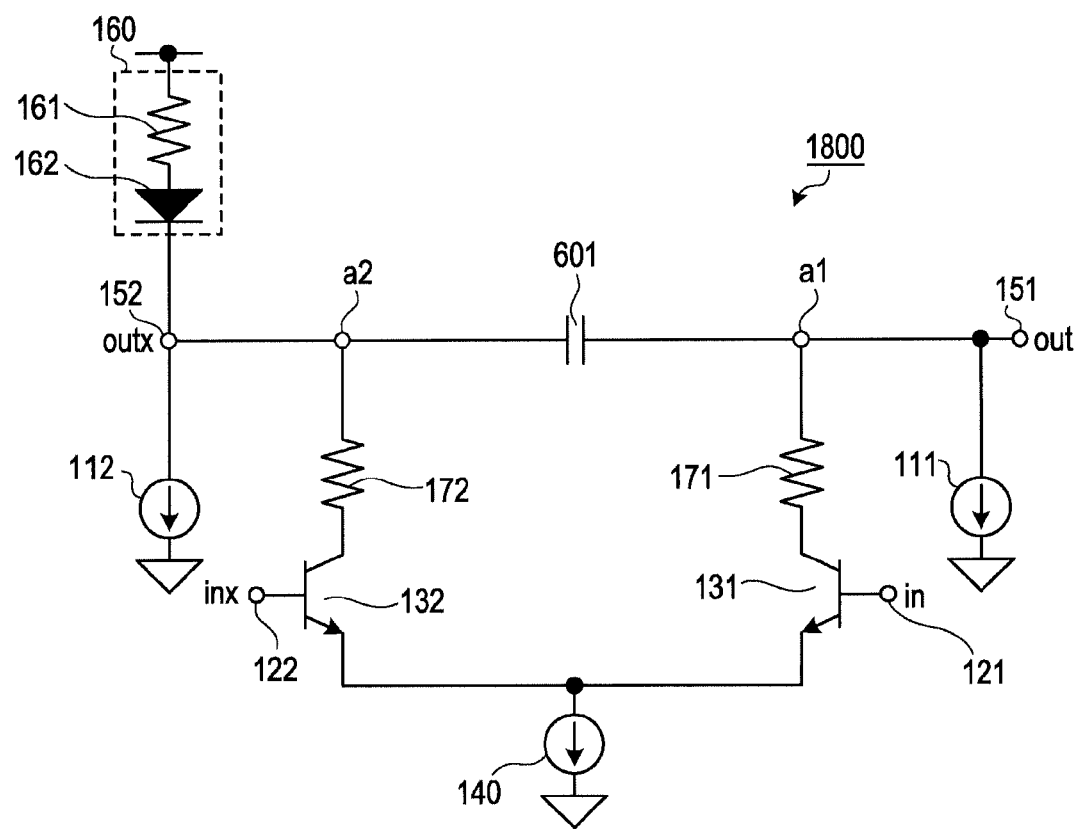
FIG. 18C is a diagram illustrating a second modification of a diode driving circuit according to the fifteenth embodiment.

FIG. 18C is a diagram illustrating a second modification of a diode driving circuit according to the fifteenth embodiment. In the diode driving circuit 1800 illustrated in FIG. 18C, a current source connection point is between a point that is stable in terms of DC and a termination ground. The diode driving circuit 1800 includes the capacitor 601 in addition to the components illustrated in FIG. 15C.

The capacitor 601 is disposed on a path connecting the output nodes 151 and 152. By disposing the dummy load 160 and symmetrically operating the output nodes 151 and 152, the points $a1$ and $a2$ on both sides of the capacitor 601 can be termination grounds having the same potential in terms of AC. As a result, the output impedance of the output node 151 can be stabilized. It is therefore possible to easily achieve matching between the output impedance of the diode driving circuit 1800 and the input impedance of a light-emitting element.

(Sixteenth Embodiment)

Figure 19A:
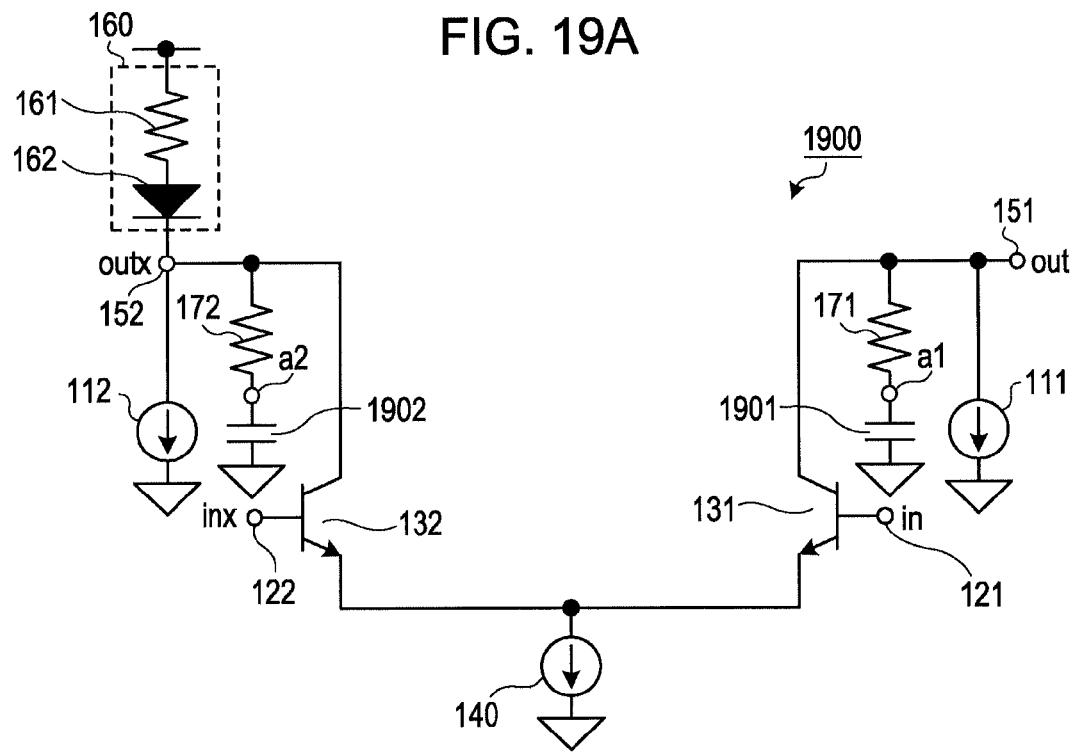
FIG. 19A is a diagram illustrating an exemplary configuration of a diode driving circuit according to a sixteenth embodiment.

In the sixteenth embodiment, an exemplary configuration in which a termination ground is directly connected to the ground will be described. FIG. 19A is a diagram illustrating an exemplary configuration of a diode driving circuit according to the sixteenth embodiment. In a diode driving circuit 1900 illustrated in FIG. 19A, a current source connection point is between a point that is stable in terms of DC and an output node. The diode driving circuit 1900 includes capacitors 1901 and 1902 in addition to the components illustrated in FIG. 16A.

One ends of the resistors 171 and 172 are connected to the output nodes 151 and 152, respectively, and the other ends of the resistors 171 and 172 are connected to the ground via the capacitors 1901 and 1902, respectively. A termination ground (the point $a1$) is between the resistor 171 and the capacitor 1901. A termination ground (the point $a2$) is between the resistor 172 and the capacitor 1902. By disposing the dummy load 160 and symmetrically operating the output nodes 151 and 152, the point $a1$ at the capacitor 1901 and the point $a2$ at the capacitor 1902 can be termination grounds having the same potential in terms of AC.

As viewed from the output node 151, the resistor 171 and the bias current source 111 are connected in parallel. Accordingly, even if the resistance value of the bias current source 111 is large, it is possible to easily achieve matching between the output impedance of the diode driving circuit 1900 and the input impedance of a light-emitting element connected to the output node 151 using the resistance value R1 of the resistor 171.

Figure 19B:
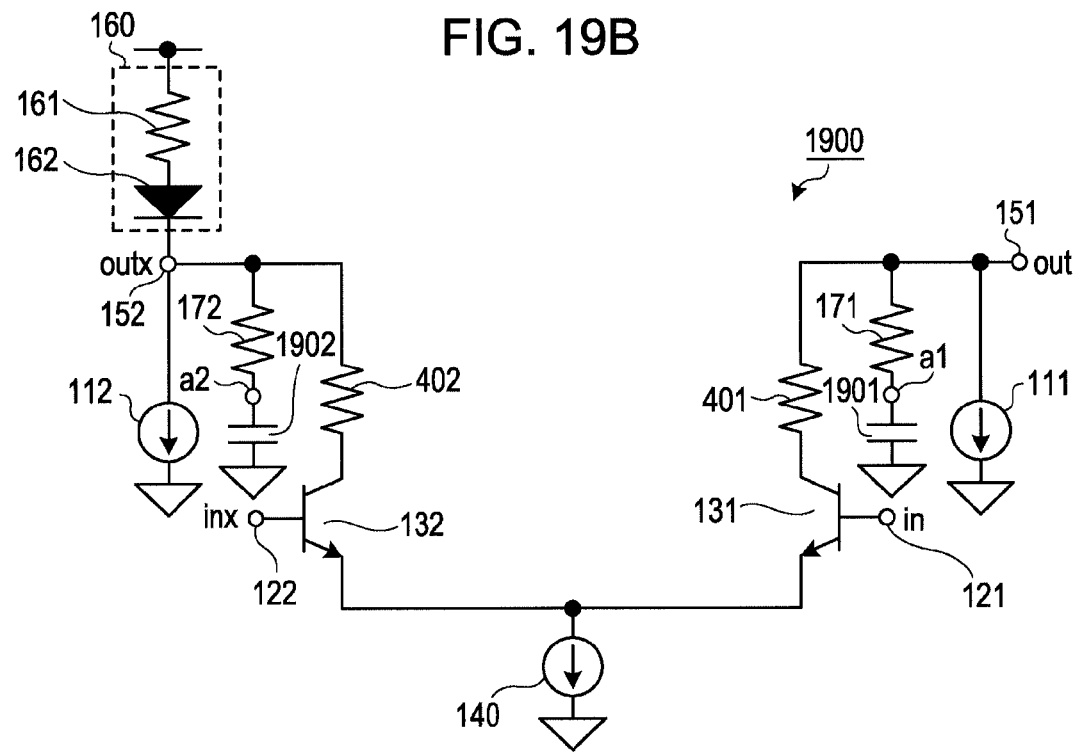
FIG. 19B is a diagram illustrating a first modification of a diode driving circuit according to the sixteenth embodiment.

FIG. 19B is a diagram illustrating a first modification of a diode driving circuit according to the sixteenth embodiment. In the diode driving circuit 1900 illustrated in FIG. 19B, a current source connection point is between a point that is stable in terms of DC and a point between divided resistors. Like the configuration illustrated in FIG. 16B, the diode driving circuit 1900 illustrated in FIG. 19B includes the resistors 401 and 402 each obtained by dividing a termination resistor into resistors connected in series. The resistor 401 is disposed between the output node 151 and the transistor 131. The resistor 402 is disposed between the output node 152 and the transistor 132.

The diode driving circuit 1900 includes the capacitors 1901 and 1902 in addition to the components illustrated in FIG. 16B. One ends of the resistors 171 and 172 are connected to the output nodes 151 and 152, respectively, and the other ends of the resistors 171 and 172 are connected to the ground via the capacitors 1901 and 1902, respectively. A termination ground (the point $a1$) is between the resistor 171 and the capacitor 1901. A termination ground (the point $a2$) is between the resistor 172 and the capacitor 1902.

By disposing the dummy load 160 and symmetrically operating the output nodes 151 and 152, the points $a1$ and $a2$ can be termination grounds having the same potential in terms of AC. As viewed from the output node 151, the resistor 171 and the bias current source 111 are connected in parallel. Accordingly, even if the resistance value of the bias current source 111 is large, it is possible to easily achieve matching between the output impedance of the diode driving circuit 1900 and the input impedance of a light-emitting element connected to the output node 151 using the resistance value R1 of the resistor 171.

Figure 19C:
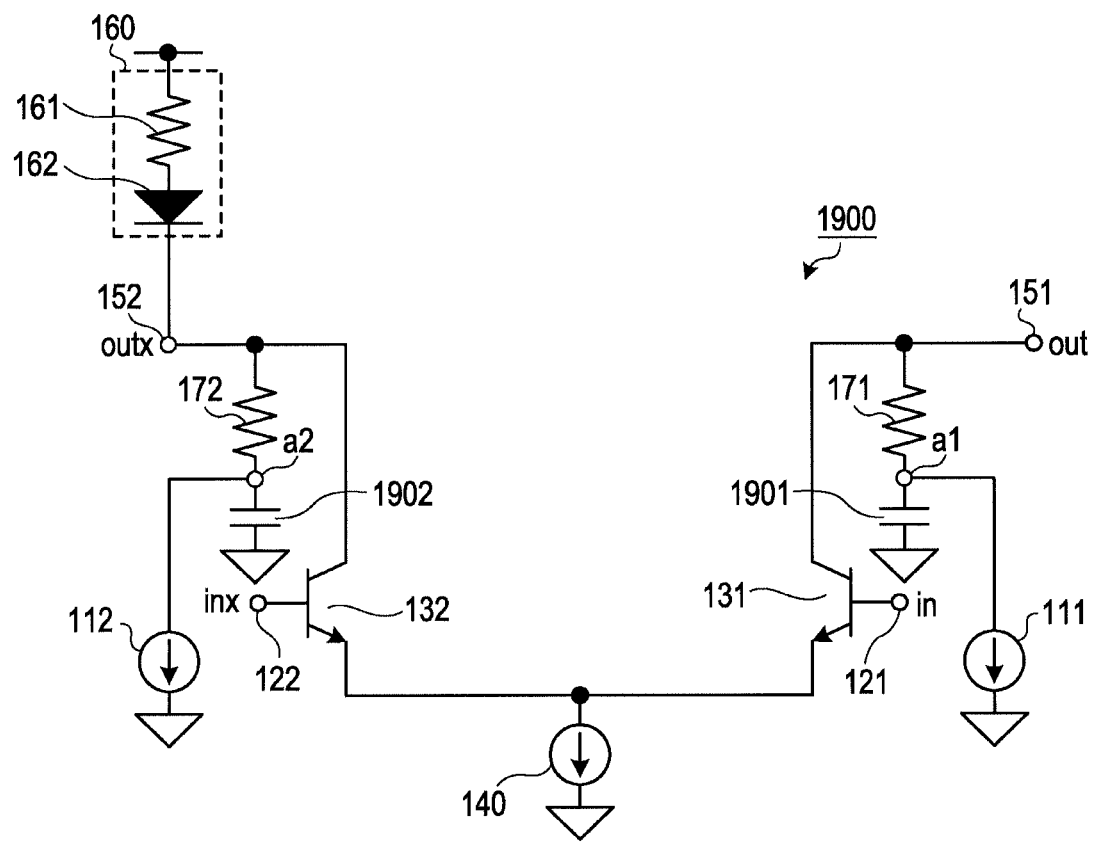
FIG. 19C is a diagram illustrating a second modification of a diode driving circuit according to the sixteenth embodiment.

FIG. 19C is a diagram illustrating a second modification of a diode driving circuit according to the sixteenth embodiment. In the diode driving circuit 1900 illustrated in FIG. 19C, a current source connection point is between a point that is stable in terms of DC and a termination ground. The diode driving circuit 1900 illustrated in FIG. 19C is a modification of the diode driving circuit 1900 illustrated in FIG. 19A.

In the diode driving circuit 1900, one end of the bias current source 111 is connected to the termination ground (the point $a1$) between the resistor 171 and the capacitor 1901, the other end of the bias current source 111 is connected to the ground, and one end of the bias current source 112 is connected to the termination ground (the point $a2$) between the resistor 172 and the capacitor 1902. Thus, in the case of capacitive grounding, a bias current source may be connected between a point that is stable in terms of DC and a termination ground.

(Seventeenth Embodiment)

Figure 20A:
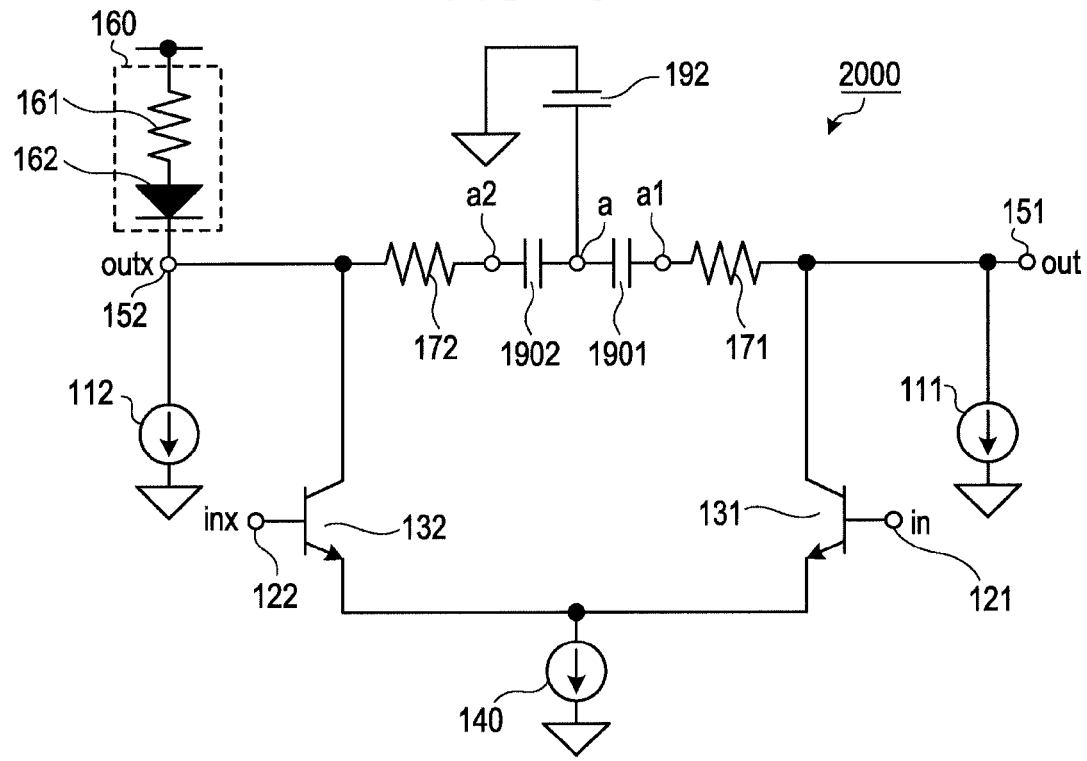
FIG. 20A is a diagram illustrating an exemplary configuration of a diode driving circuit according to a seventeenth embodiment.

In the seventeenth embodiment, an exemplary configuration in which a termination ground is connected to a voltage supply will be described. FIG. 20A is a diagram illustrating an exemplary configuration of a diode driving circuit according to the seventeenth embodiment. In a diode driving circuit 2000 illustrated in FIG. 20A, a current source connection point is between a point that is stable in terms of DC and an output node. The diode driving circuit 2000 includes the capacitors 1901 and 1902 at both ends of the termination ground (the point a) connected to the voltage supply 192 in addition to the components illustrated in FIG. 17A.

One end of the resistor 171 is connected to the output node 151, and the other end of the resistor 171 is connected to the capacitor 1902 and the voltage supply 192 via the capacitor 1901. One end of the resistor 172 is connected to the output node 152, and the other end of the resistor 172 is connected to the capacitor 1901 and the voltage supply 192 via the capacitor 1902.

One end of the voltage supply 192 is connected to the ground, and the other end of the voltage supply 192 is connected to the point a (the termination ground). It is therefore possible to change a bias current and control a direct current passing through the resistors 171 and 172. By disposing the dummy load 160 and symmetrically operating the output nodes 151 and 152, the point al between the capacitor 1901 and the resistor 171 and the point $a2$ between the capacitor 1902 and the resistor 172 can be termination grounds having the same potential in terms of AC. As a result, the output impedance of the output node 151 can be stabilized. It is therefore possible to easily achieve matching between the output impedance of the diode driving circuit 2000 and the input impedance of a light-emitting element.

Figure 20B:
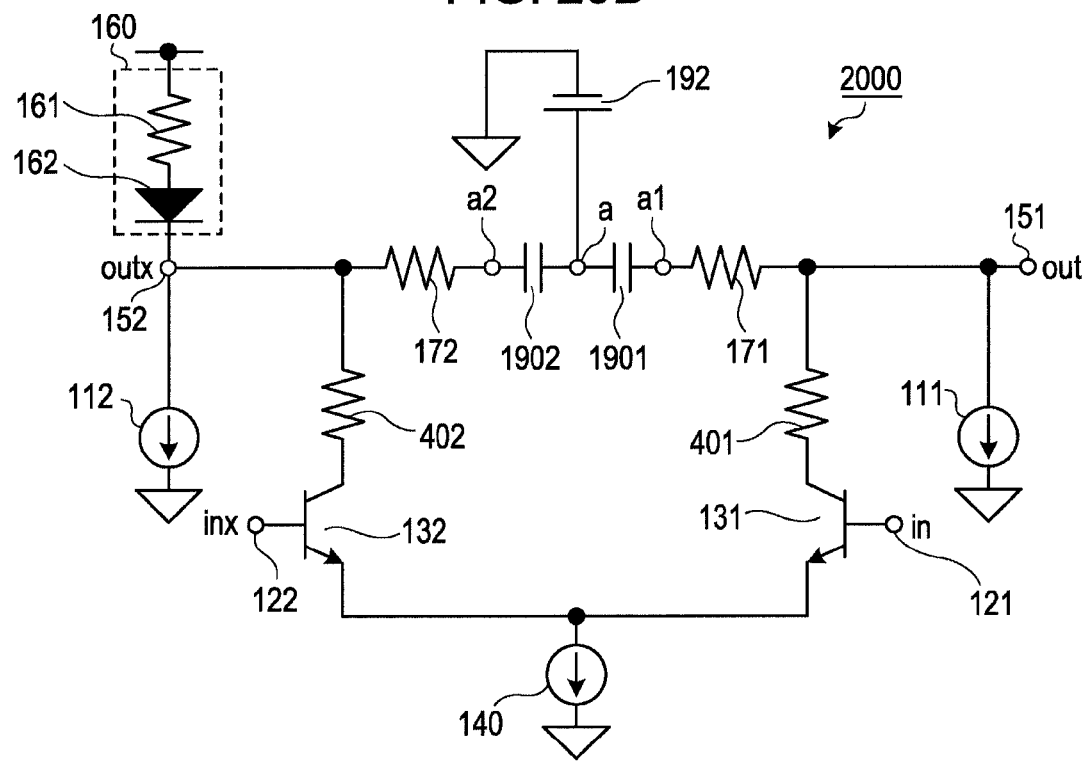
FIG. 20B is a diagram illustrating a first modification of a diode driving circuit according to the seventeenth embodiment.

FIG. 20B is a diagram illustrating a first modification of a diode driving circuit according to the seventeenth embodiment. In the diode driving circuit 2000 illustrated in FIG. 20B, a current source connection point is between a point that is stable in terms of DC and a point between divided resistors. The diode driving circuit 2000 includes the capacitors 1901 and 1902 at both ends of the termination ground (the point a) connected to the voltage supply 192 in addition to the components illustrated in FIG. 17B.

One end of the resistor 171 is connected to the output node 151, and the other end of the resistor 171 is connected to the capacitor 1902 and the voltage supply 192 via the capacitor 1901. One end of the resistor 172 is connected to the output node 152, and the other end of the resistor 172 is connected to the capacitor 1901 and the voltage supply 192 via the capacitor 1902. The resistor 401 is disposed between the output node 151 and the transistor 131. The resistor 402 is disposed between the output node 152 and the transistor 132.

One end of the voltage supply 192 is connected to the ground, and the other end of the voltage supply 192 is connected to the point a (the termination ground). It is therefore possible to change a bias current and control a direct current passing through the resistors 171 and 172. By disposing the dummy load 160 and symmetrically operating the output nodes 151 and 152, the point a1 between the capacitor 1901 and the resistor 171 and the point *a2* between the capacitor 1902 and the resistor 172 can be termination grounds having the same potential in terms of AC. As a result, the output impedance of the output node 151 can be stabilized. It is therefore possible to easily achieve matching between the output impedance of the diode driving circuit 2000 and the input impedance of a light-emitting element.

Using the above-described cathode driving configurations (described in the twelfth to seventeenth embodiments), the same waveform as that obtained using the above-described anode driving configurations (described with reference to FIGS. 13B to 13E) can be obtained. It is therefore possible to stabilize a termination resistor in terms of AC, achieve impedance matching, and generate a stable driving signal.

(Inductor Peaking)

As described in the above-described embodiments with reference to, for example, FIG. 7A, diode driving circuits according to the first to seventeenth embodiments may further include an inductor. FIGS. 21A to 21D are diagrams illustrating exemplary configurations of diode driving circuits each including an inductor. In these diagrams, exemplary cathode driving configurations are illustrated. However, an exemplary anode driving configuration may be employed.

Figure 21A:
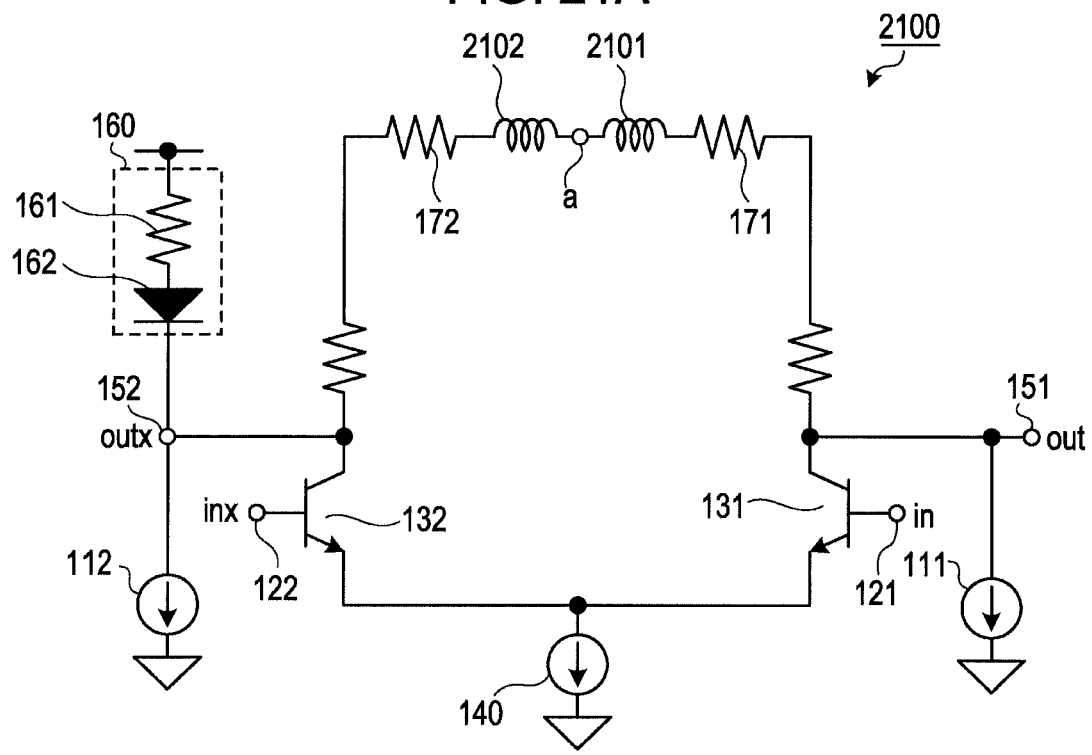
FIG. 21A is a diagram illustrating a first exemplary configuration of a diode driving circuit including an inductor.
Figure 21B:
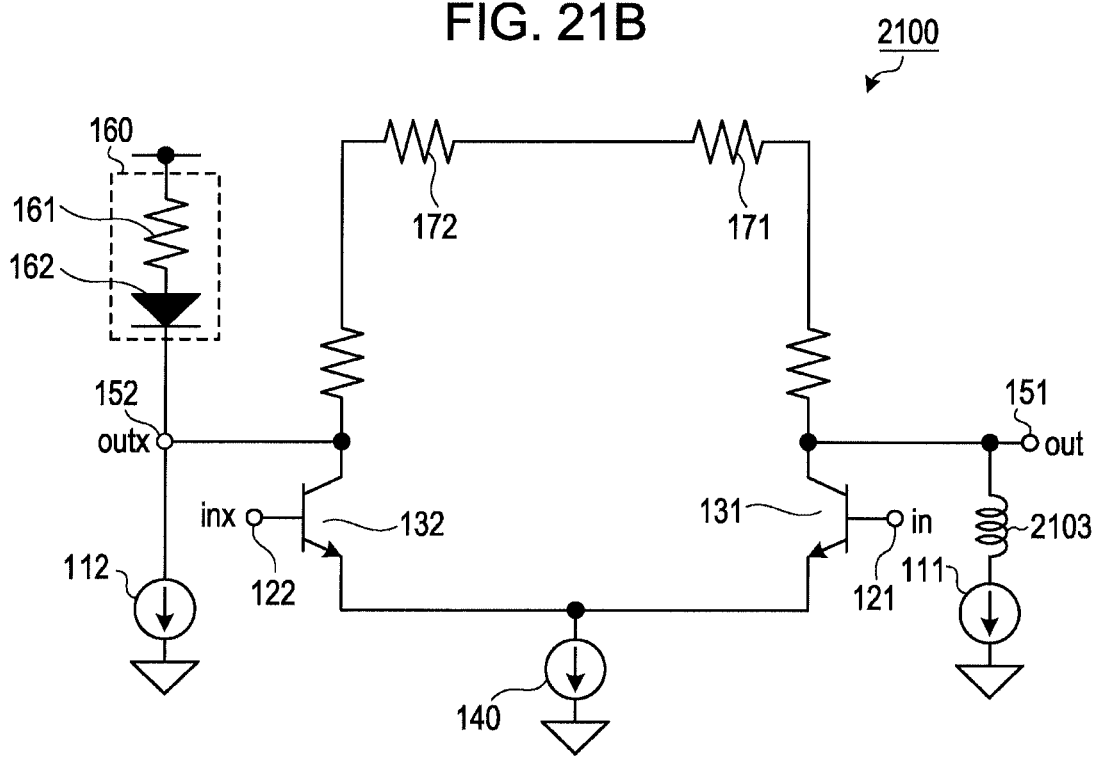
FIG. 21B is a diagram illustrating a second exemplary configuration of a diode driving circuit including an inductor.
Figure 21C:
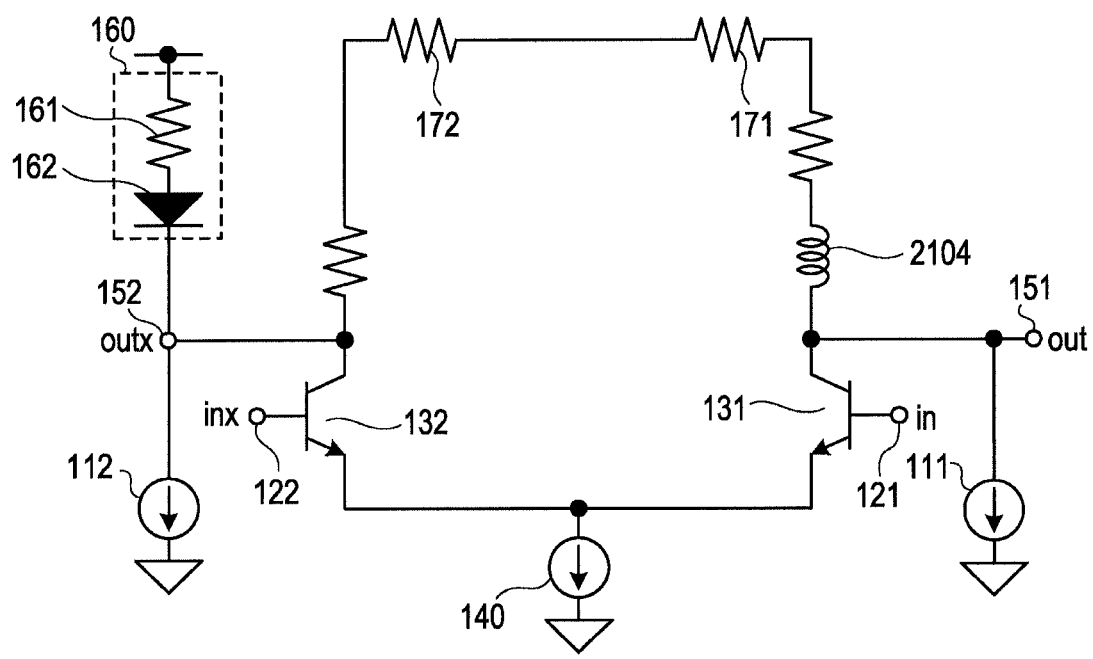
FIG. 21C is a diagram illustrating a third exemplary configuration of a diode driving circuit including an inductor.

In a diode driving circuit 2100 illustrated in FIG. 21A, on a path connecting the output nodes 151 and 152, inductors 2101 and 2102 are connected between the resistors 171 and 172 connected to the termination ground (the point a). In the diode driving circuit 2100 illustrated in FIG. 21B, an inductor 2103 is connected between the bias current source 111 and the output node 151. In the diode driving circuit 2100 illustrated in FIG. 21C, one end of an inductor 2104 is connected to the resistor 171 and the other end of the inductor 2104 is connected to the bias current source 111 and the transistor 131.

Figure 21D:
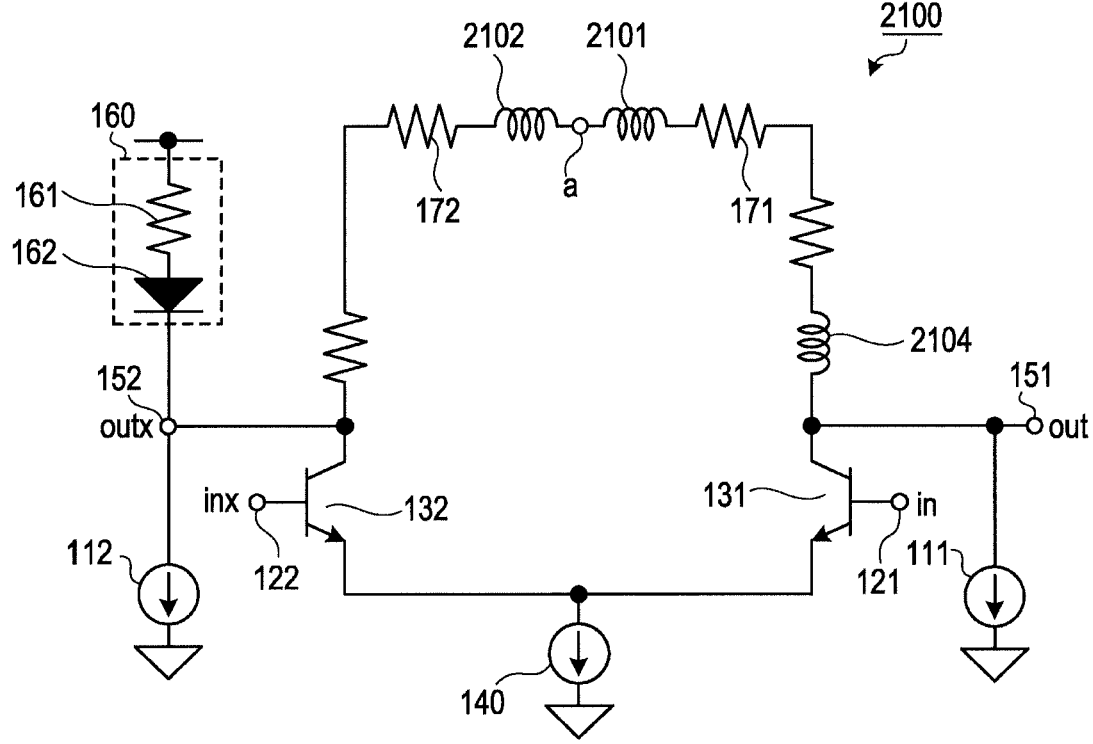
FIG. 21D is a diagram illustrating a fourth exemplary configuration of a diode driving circuit including an inductor.

In the diode driving circuit 2100 illustrated in FIG. 21D, the inductors 2101 and 2102 are connected between the resistors 171 and 172 connected to the termination ground (the point a), one end of the inductor 2104 is connected to the resistor 171, and the other end of the inductor 2104 is connected to the bias current source 111 and the transistor 131.

In the diode driving circuit 2100 including an inductor, since the high-frequency component of a driving signal makes a voltage jump, the diode driving circuit 2100 can be operated at a high speed. By increasing the number of inductors as illustrated in FIG. 21D, a current passing through each inductor can be reduced. Accordingly, the line width of each inductor can be reduced and the length of each inductor can be increased. That is, it is possible to increase an inductance value without changing a footprint in each inductor. The degree of a voltage jump made by a high-frequency component can be therefore increased.

(Output Voltage Stabilizing Control)

Next, output voltage stabilizing control will be described. This control processing can be applied to the above-described embodiments. In the diode driving circuits according to above-described embodiments, the threshold value of a load (the diode 162) is changed in accordance with individual differences made in a manufacturing process and a change in temperature. In a diode driving circuit according to an embodiment having the configuration in which a termination ground is directly connected to a voltage supply or the ground, the current Iload (see FIG. 13A) output from each of the output nodes 151 and 152 is changed in accordance with variation in load and a change in temperature.

Figure 22:
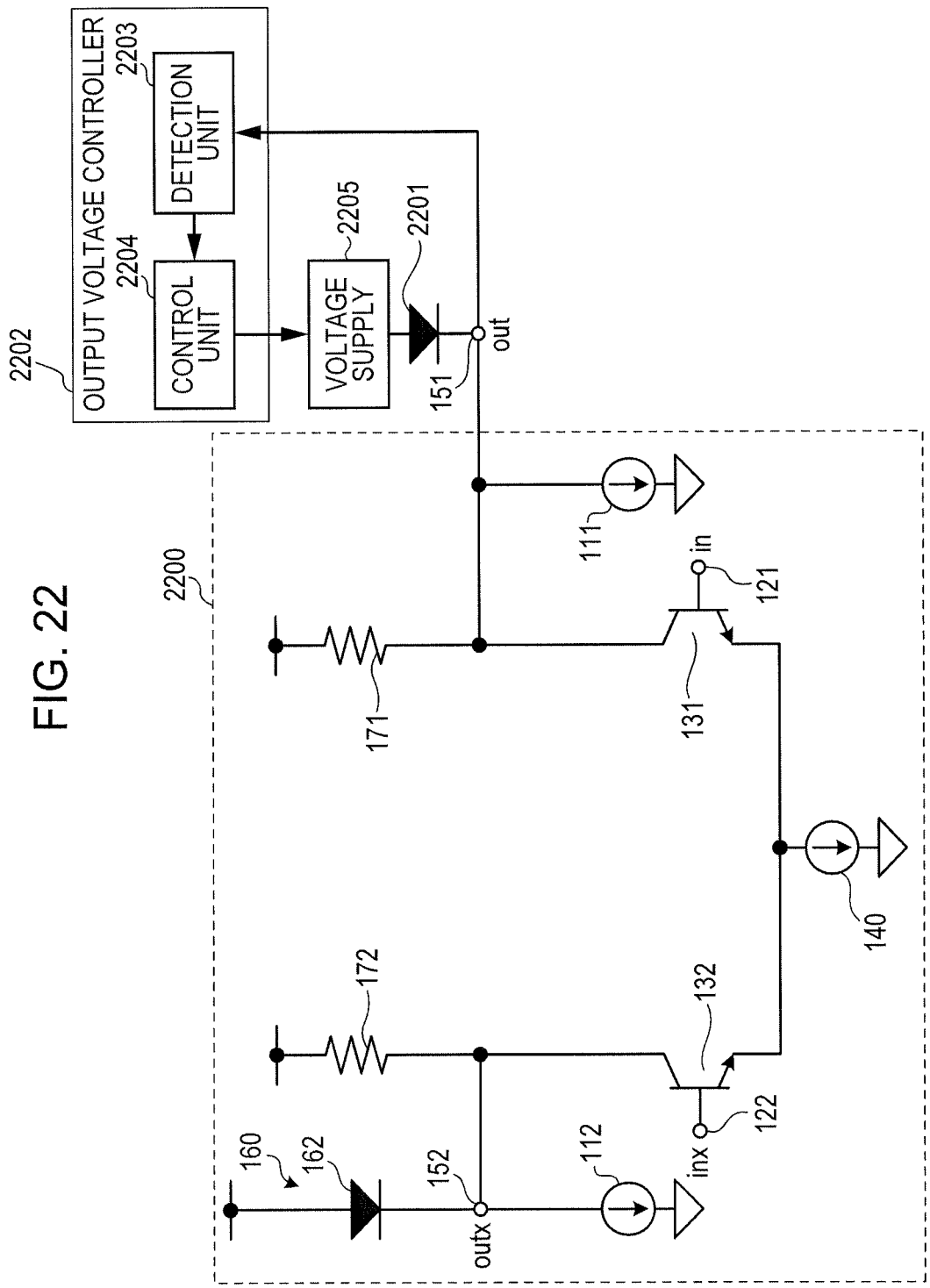
FIG. 22 is a diagram illustrating an exemplary configuration of a diode driving circuit for controlling an output voltage.

FIG. 22 is a diagram illustrating an exemplary configuration of a diode driving circuit for controlling an output voltage. In a diode driving circuit 2200 illustrated in FIG. 22, a termination ground is directly connected to the ground or a voltage supply. The output node 151 in the diode driving circuit 2200 is connected to a load (a diode 2201) and the output node 152 in the diode driving circuit 2200 is connected to the dummy load 160 (the diode 162).

An output voltage controller 2202 is connected to the output node 151. Under the control of the output voltage controller 2202, a voltage supply 2205 such as a regulator changes a driving voltage for the diode 2201 that is a load and performs control processing to stabilize an output voltage Vout of the output node 151.

The output voltage controller 2202 includes a detection unit 2203 and a control unit 2204. The detection unit 2203 detects the output voltage Vout of the output node 151. The control unit 2204 compares the voltage detected by the detection unit 2203 with a predetermined reference voltage set in advance and outputs a feedback amount corresponding to the difference between these voltages to the voltage supply 2205 as a voltage control signal.

Upon receiving the voltage control signal from the output voltage controller 2202, the voltage supply 2205 variably changes a supply voltage so that a voltage having a value corresponding to the difference is set. As a result, even if variations among the diodes 2201 and the change in temperature occur, the output voltage Vout of the output node 151 can be stabilized so that the output voltage Vout has a reference value. The voltage control signal output from the control unit 2204 is also used to control a voltage supply (not illustrated) connected to the output node 152

The voltage control signal output from the control unit 2204 is supplied to the voltage supply 2205 for driving the diode 2201 and the dummy load 160, but may be supplied to the bias current sources 111 and 112 in the diode driving circuit 2200 and the voltage supply 192 connected to a termination ground. In this case, the output voltage Vout can be similarly stabilized.

As described previously, using a driving circuit according to an embodiment of the present invention, it is possible to drive a driving target at a high speed by both anode driving and cathode driving. A driving target driven by the diode driving circuit 100 is the light-emitting element (light-emitting diode) 1210 in the above-described embodiments, but is not limited thereto.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A driving circuit for driving a laser diode, comprising:
    at least one differential pair including a first output node and a second output node and configured to switch an output current, the output current being supplied to the laser diode through the first output node;
    a branching unit configured to branch a driving signal and generate a plurality of branched driving signals;
    a delay circuit configured to make a delay difference between the plurality of branched driving signals;
    a current source configured to adjust the output current;
    a dummy load coupled to the second output node, the dummy load having an equivalent characteristic to the laser diode;
    a first termination resistor coupled between the first output node and a termination ground; and
    a second termination resistor coupled between the second output node and the termination ground, the first termination resistor and the second termination resistor being provided as a pair, wherein
        a resistance value of one of the first termination resistor and the second termination resistor is equivalent to a resistance value of the laser diode,
        the termination ground is connected to a voltage source, and
        the at least one differential pair receives the branched driving signals, as input signals for generating the output current, from the delay circuit.

2. The driving circuit according to claim 1, wherein the dummy load has a resistor and a diode, and the same characteristic as the laser diode.

3. The driving circuit according to claim 1, wherein the termination ground is the voltage source or a ground.

4. The driving circuit according to claim 1, wherein the termination ground is a virtual ground, the virtual ground being a node that has the same potential in terms of AC.

5. The driving circuit according to claim 1, wherein at least one of the first and second termination resistors is coupled to the termination ground in terms of AC using a capacitor.

6. The driving circuit according to claim 1, further comprising adjustment elements to adjust potentials of the first and second output nodes coupled in series to the first and second termination resistors, respectively.

7. The driving circuit according to claim 6, wherein each of the adjustment elements is the voltage source or a diode.

8. The driving circuit according to claim 1, further comprising an adjustment element to adjust a bias current passing through the laser diode, coupled between the termination ground and the voltage source.

9. The driving circuit according to claim 8, wherein the termination ground is a virtual ground, the virtual ground being a node that has the same potential in terms of AC.

10. The driving circuit according to claim 8, wherein the adjustment element is a current source.

11. The driving circuit according to claim 1, wherein the current source is coupled between a DC stable node and the first output node, the DC stable node being a node that has the same potential in terms of DC.

12. The driving circuit according to claim 1, wherein the current source is coupled between a DC stable node and the termination ground, the DC stable node being a node that has the same potential in terms of DC.

13. The driving circuit according to claim 1, further comprising an inductor between the first output node and the current source.

14. The driving circuit according to claim 1, further comprising an inductor coupled in series to the first termination resistor between the termination ground and the first output node.

15. The driving circuit according to claim 1, wherein the dummy load includes a diode-connected transistor and a resistor.

16. A driving circuit for driving a laser diode, comprising:
    at least one differential pair including a first output node and a second output node and configured to switch an output current, the output current being supplied to the laser diode through the first output node;
    a detection unit configured to detect an output voltage of the first output node; and
    a control unit configured to compare the detected output voltage with a predetermined reference voltage and feed back a voltage control signal on the basis of a difference between the detected output voltage and the predetermined reference voltage so as to stabilize the output voltage
    a current source configured to adjust the output current;
    a dummy load coupled to the second output node, the dummy load having an equivalent characteristic to the laser diode;
    a first termination resistor coupled between the first output node and a termination ground; and
    a second termination resistor coupled between the second output node and the termination ground, the first termination resistor and the second termination resistor being provided as a pair, wherein
        a resistance value of one of the first termination resistor and the second termination resistor is equivalent to a resistance value of the laser diode,
        the termination ground is connected to a voltage source.

17. The driving circuit according to claim 16, wherein the control unit feeds the voltage control signal back to a driving voltage source for driving the laser diode and the dummy load.

18. The driving circuit according to claim 16, wherein the control unit feeds the voltage control signal back to a voltage supply coupled to the termination ground.

19. The driving circuit according to claim 16, wherein the control unit feeds the voltage control signal back to the current source.

* * * * *